United States Patent
Jeong et al.

(10) Patent No.: US 6,385,736 B1
(45) Date of Patent: May 7, 2002

(54) METHOD AND APPARATUS FOR MANAGING DEFECT AREAS OF RECORDING MEDIUM USING SECTOR NUMBER COMPARISON TECHNIQUES

(75) Inventors: Kyu Hwa Jeong; Dong Chul Kang, both of Kyungki-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/219,118

(22) Filed: Dec. 23, 1998

(30) Foreign Application Priority Data

Dec. 23, 1997 (KR) .......................... 1997-72136
Oct. 7, 1998 (KR) .......................... 1998-41894

(51) Int. Cl.$^7$ ................................................ G06F 11/00
(52) U.S. Cl. ...................... 714/8; 714/9; 714/5; 714/48
(58) Field of Search .................... 714/8, 2, 5, 31, 714/42, 723, 9, 25, 48, 49, 7

(56) References Cited

U.S. PATENT DOCUMENTS

| | | | | |
|---|---|---|---|---|
| 4,406,000 A | * | 9/1983 | Shoji et al. | 369/44 |
| 4,972,398 A | * | 11/1990 | Wachi | 369/44.25 |
| 5,237,553 A | * | 8/1993 | Fukushima et al. | 369/58 |
| 5,270,877 A | * | 12/1993 | Fukusima et al. | 360/48 |
| 5,442,614 A | * | 8/1995 | Tamegai | 369/58 |
| 5,526,335 A | * | 6/1996 | Tamegai | 369/58 |
| 5,739,519 A | * | 4/1998 | Tsuchiya | 235/456 |
| 6,025,966 A | * | 2/2000 | Nemazie et al. | 360/53 |
| 6,038,209 A | * | 3/2000 | Satoh | 369/275.3 |
| 6,279,118 B1 | * | 8/2001 | Kang | 714/7 |

* cited by examiner

*Primary Examiner*—Thomas Lee
*Assistant Examiner*—Rijue Mai
(74) *Attorney, Agent, or Firm*—Birch, Stewart, Kolasch & Birch, LLP

(57) ABSTRACT

A method and apparatus for managing defect areas of a rewritable optical recording medium. Upon receiving a write or read command from a host, the defect areas management apparatus decodes a PID of a position being currently traced by an optical pickup, generates the resultant physical sector number of the current position and compares it with a physical sector number of a defect area stored in a DMA storage unit. If the two physical sector numbers are the same, the defect areas management apparatus does not write or read data on a sector of the position traced by the optical pickup. Therefore, the defect areas management apparatus is capable of efficiently managing defect areas of the optical recording medium.

36 Claims, 15 Drawing Sheets

FIG.13

| start PSN(C) of zone1 : P_zone[0] |
|---|
| start PSN(C) of zone2 : P_zone[1] |
| start PSN(C) of zone3 : P_zone[3] |
| ⋮ |
| start PSN of last zone | start PSN of data area ≤ zone0
  < P_zone[0]
P_zone[0] ≤ zone1 < P_zone[1]
P_zone[1] ≤ zone2 < P_zone[2]

FIG.14

| start LSN(D) of zone1 : L_zone[0] |
|---|
| start LSN(G) of zone1 : L_zone[1] |
| start LSN(J) of zone1 : L_zone[2] |
| ⋮ |
| start PSN of last zone |

0 ≤ LSN < L_zone[0] → zone0
L_zone[0] ≤ LSN < L_zone[1] → zone1
L_zone[1] ≤ LSN < L_zone[2] → zone2

FIG.15

| offset[zone0] |
|---|
| offset[zone1] |
| offset[zone2] |
| ⋮ |
| offset[zoneN] |

METHOD AND APPARATUS FOR MANAGING DEFECT AREAS OF RECORDING MEDIUM USING SECTOR NUMBER COMPARISON TECHNIQUES

BACKGROUND OF THE INVENTION

1. Field of the Invention

The present invention relates in general to a rewritable optical recording medium system, and more particularly to a method and apparatus for managing defect areas of an optical recording medium.

2. Description of the Prior Art

Optical recording media are generally classified into three types, or a read only, ROM type, a once writable, WORM type and a repeatedly writable, rewritable type according to the possibility of repetitive writing.

The repeatedly writable optical recording media may be, for example, a rewritable compact disc (CD-RW), a rewritable digital versatile disc (DVD-RAM or DVD-RW), etc.

In such a rewritable optical recording medium, however, because information write/read operations are repeatedly performed according to the availability of the optical recording medium, a mixing ratio of a mixture constituting an information recording layer in the optical recording medium becomes different from the initial value with the lapse of time. For this reason, the information recording layer loses its characteristics, resulting in an error being generated in the information write/read operations.

This phenomenon is called a deterioration, which is revealed as defect areas when formatting, write and read commands of the optical recording medium are performed.

The defect areas of the rewritable optical recording medium may be generated due to a scratch on its surface, a particle such as dust, an error in manufacturing process, etc., in addition to the above-mentioned deterioration.

In this connection, the defect areas of the rewritable optical recording medium must be managed to prevent data from being written/read thereon.

To this end, a conventional rewritable optical recording medium such as a rewritable optical disc comprises defect management areas (referred to hereinafter as DMAs) provided in lead-in and lead-out areas, as shown in FIG. 1. Each DMA includes a primary defect list (referred to hereinafter as PDL) which is a primary defect data storage unit, and a secondary defect list (referred to hereinafter as SDL) which is a secondary defect data storage unit.

A data area is managed in the unit of zones. Each of the zones is composed of a user area, in which actual data is written, and a spare area to be used when the user area is subjected to a defect. As shown in FIG. 2, a guard area is assigned between the adjacent zones to make a distinction therebetween.

The PDL is generally adapted to store entries of defect sectors generated in a disc manufacturing process and entries of defect sectors detected in disc formatting, or initialization and re-initialization.

The SDL is listed in the unit of blocks. This SDL is adapted to store entries of defect areas generated after formatting or entries of defect areas incapable of being stored in the PDL during formatting. Each SDL entry is provided with an area for storing a sector number of a first sector in a block in which a defect sector is generated, and an area for storing a sector number of a first sector in a replacement block with which the defect sector block is to be replaced.

In such an optical disc, each sector has a logical sector number (referred to hereinafter as LSN) and a physical sector number (referred to hereinafter as PSN). The LSNs are presented to only the user areas in which actual data are written. The PSNs indicate physical positions on the disc assigned to all sectors in the disc manufacturing process, respectively.

Hence, if no defect is present in the data area, the LSNs will be assigned to only the user areas in which actual data are written, whereas the PSNs will be assigned to all areas, as shown in FIG. 3a.

On the other hand, in the case where defects are present in the data area, defect areas (i.e., defect sectors or defect blocks) in the data area must be replaced with normal areas. Generally, slipping replacement and linear replacement methods have been recommended by the optical recording medium standard group.

The slipping replacement method is applied to the case where a defect area is registered in the PDL. In this slipping replacement method, as shown in FIG. 3b, if a defect sector listed in the PDL is present in the user area in which actual data is written, then it is jumped over and replaced with a normal sector subsequent thereto for the writing of data. In this case, a PSN is present in the defect sector listed in the PDL as it is, but no LSN is present in that defect sector because data is not written or read thereon. Instead, the same number of LSNs as that of defect sectors is assigned in the spare are. The spare area with the LSNs assigned become the user area by formatting.

The linear replacement method is applied to the case where a defect area is registered in the SDL. In this linear replacement method, as shown in FIG. 3c, if a defect block listed in the SDL is present in the user area or the spare area, then it is replaced with a block-unit replacement area assigned in the spare area, for the writing of data. In this case, PSNs assigned respectively to sectors in the defect block are present as they are, but LSNs are moved together with data to the replacement block.

However, the above-mentioned slipping replacement and linear replacement methods require a method for searching the optical recording medium for defect sectors registered in the PDL and defect blocks registered in the SDL and a method and apparatus for efficiently managing the defect sectors and defect blocks.

SUMMARY OF THE INVENTION

Therefore, it is an object of the present invention to provide a method and apparatus for efficiently managing defect areas of an optical recording medium.

It is another object of the present invention to provide a method and apparatus for managing defect areas of an optical recording medium, in which a data write section and data read section search for and manage defect areas registered in a PDL and SDL.

It is a further object of the present invention to provide a method and apparatus for managing defect areas of an optical recording medium, in which a data write/read controller searches for and manages defect areas registered in a PDL and SDL.

It is yet another object of the present invention to provide a method and apparatus for managing defect areas of an optical recording medium, in which a PSN corresponding to an LSN sent from a host is accurately searched for, using a table.

In accordance with one aspect of the present invention, there is provided a method of managing defect areas of an optical recording medium, comprising the first step of reading a defect management area list and storing the read defect management area list; the second step of comparing a physical sector number of a current position with the defect management area list stored at the first step; and the third step of writing or reading no data on a physical sector of the current position if it is determined at the second step that the physical sector number of the current position is the same as a physical sector number in the defect management area list stored at the first step.

Preferably, the comparison step includes the step of reading a physical sector number of a first defect area subsequent to a first sector to be written or read, from the defect management area list stored at the storage step, storing the read physical sector number and comparing the stored physical sector number with the physical sector number of the current position.

The comparison step includes the step of, if it is determined that the physical sector number of the current position is the same as the stored physical sector number, reading a physical sector number subsequent to the stored physical sector number, from the defect management area list stored at the storage step and updating the stored physical sector number to the read physical sector number.

The comparison step includes the step of, when the physical sector number of the defect area is stored, indicating that the defect area is that registered in a primary data list or a secondary data list.

Preferably, the writing or reading step includes the step of writing or reading data on a normal sector subsequent to the physical sector of the current position while jumping over it, if it is determined at the comparison step that the physical sector number of the current position is the same as the physical sector number in the defect management area list stored at the storage step and it corresponds to a defect area registered in a primary defect list.

The writing or reading step includes the step of writing or reading data of a block including the physical sector of the current position on a replacement block in a spare area, if it is determined at the comparison step that the physical sector number of the current position is the same as the physical sector number in the defect management area list stored at the storage step and it corresponds to a defect area registered in a secondary defect list.

The writing or reading step includes the step of writing or reading data on a normal block subsequent to a block including the physical sector of the current position while jumping over it, if it is determined at the comparison step that the physical sector number of the current position is the same as the physical sector number in the defect management area list stored at the storage step and it corresponds to a defect area registered in a secondary defect list.

The writing or reading step includes the step of receiving a logical sector number included in a write or read command from an external host, converting the received logical sector number into a physical sector number and writing or reading data according to the converted physical sector number.

More preferably, the sector number conversion step includes the first step of detecting a zone to which the logical sector number belongs, upon receiving the logical sector number; the second step of obtaining an offset[zone] value corresponding to the zone detected at the first step; the third step of adding a start physical sector number of a data area to the logical sector number and then adding the offset[zone] value obtained at the second step to the resultant value to obtain a temporary physical sector number; and the fourth step of obtaining the number of registered defect areas in a zone corresponding to the temporary physical sector number, which have values smaller than the temporary physical sector number and adding the obtained value to the temporary physical sector number to obtain a final physical sector number.

In accordance with another aspect of the present invention, there is provided an apparatus for managing defect areas of an optical recording medium, comprising control means for converting a logical sector number from a host into a physical sector number and then generating write/read commands; storage means for reading a defect management area list and storing the read defect management area list; comparison means for comparing a physical sector number of a current position with the defect management area list stored in the storage means; and write/read means for determining whether the data write/read operations are to be performed on a physical sector of the current position, in response to the write/read commands from the control means and the compared result of the comparison means and writing or reading data on the physical sector of the current position in accordance with the determined result.

Preferably, each of the write/read commands from the control means includes a physical sector number and a length of data to be written or read.

Preferably, the comparison means includes a register for reading a physical sector number of a first defect area subsequent to a first sector to be written or read, from the storage means and storing the read physical sector number, the comparison means comparing the physical sector number stored in the register with the physical sector number of the current position.

The comparison means is adapted to, if it is determined that the physical sector number of the current position is the same as the physical sector number stored in the register, read a physical sector number subsequent to the stored physical sector number, from the storage means and update the register to the read physical sector number.

In accordance with yet another aspect of the present invention, there is provided an apparatus for managing defect areas of an optical recording medium, comprising storage means for reading a defect management area list and storing the read defect management area list; control means for converting the logical sector number into a physical sector number, comparing a physical sector number of a current position with the defect management area list stored in the storage means, determining whether the data write/read operations are to be performed on a physical sector of the current position, in accordance with the compared result and generating control signals in accordance with the determined result; and write/read means for performing the data write/read operations in response to the control signals from the control means.

Preferably, the control signals from the control means include write/read enable and disable signals.

Preferably, the control means is adapted to read a physical sector number of a first defect area subsequent to a first sector to be written or read, from the storage means, store the read physical sector number, compare the stored physical sector number with the physical sector number of the current position, read a physical sector number subsequent to the stored physical sector number, from the storage means if it is determined that the physical sector number of the current position is the same as the stored physical sector number and update the stored physical sector number to the read physical sector number.

Preferably, the write/read means is adapted to detect a physical identification of the current position to generate the physical sector number of the current position.

BRIEF DESCRIPTION OF THE DRAWINGS

The above and other objects, features and advantages of the present invention will be more clearly understood from the following detailed description taken in conjunction with the accompanying drawings, in which:

FIG. 8b is a view illustrating an update operation of the register in FIG. 8a;

FIG. 13 is a table for discrimination between physical zones in FIG. 12;

FIG. 14 is a table for detection of a zone to which a start LSN belongs in FIG. 12;

FIG. 15 is a an offset table for detection of a start PSN in FIG. 12;

FIG. 16b is a view showing a format of a data ID in FIG. 16a.

DETAILED DESCRIPTION OF THE PREFERRED EMBODIMENTS

The principle of the present invention which searches an optical recording medium for defect areas registered in a PDL and SDL and manages the searched defect areas will hereinafter be described according to a first embodiment in which it is implemented by an encoder and decoder and a second embodiment in which it is implemented by a microcomputer.

First Embodiment

Figure 4:
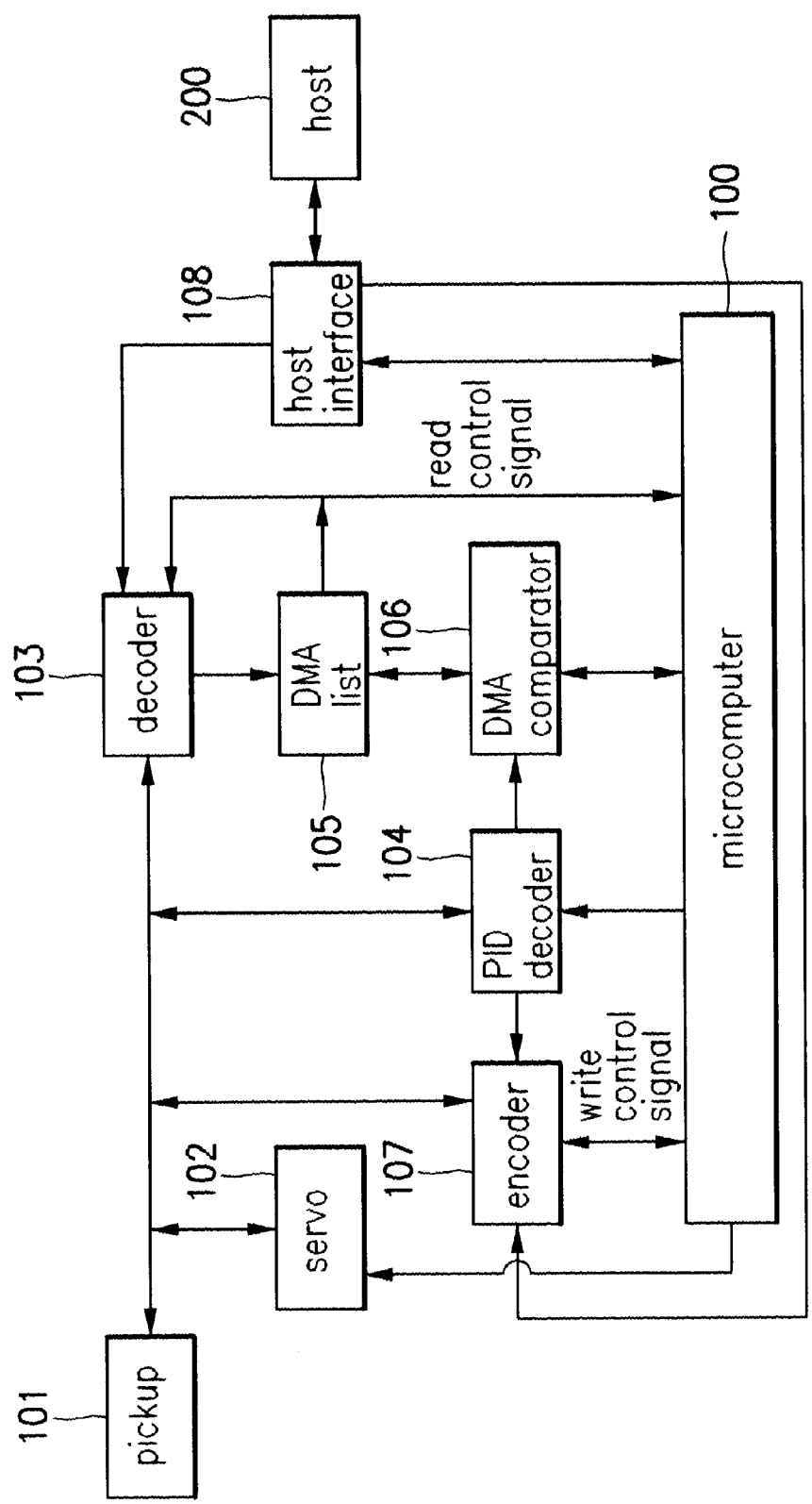
FIG. 4 is a block diagram showing an example of an apparatus for managing defect areas of an optical recording medium in accordance with a first embodiment of the present invention, in which a DMA comparator is separately provided.

With reference to FIG. 4, there is shown in block form an example of an apparatus for managing defect areas of an optical recording medium in accordance with a first embodiment of the present invention. As shown in this drawing, the defect areas management apparatus comprises an optical pickup 101 for writing and reading data on the optical recording medium, a servo 102 for performing focusing and tracking operations of the optical pickup 101, an encoder 107 for encoding data to be written, into a format desired by the optical recording medium and writing the encoded data on the optical recording medium through the optical pickup 101, and a decoder 103 for reading the data written on the optical recording medium and decoding the read data into the original format. The defect areas management apparatus further comprises a PID decoder 104 for decoding a physical identification (referred to hereinafter as PID) of a position being currently traced by the optical pickup 101, a DMA data storage unit 105 for reading DMA information written on lead-in and lead-out areas of the optical recording medium and storing the read DMA information, a DMA comparator 106 for comparing PID information from the PID decoder 104 with a PSN of a defect area stored in the DMA data storage unit 105, and a microcomputer 100 for outputting a write command or a read command to the encoder 107 or the decoder 103 in response to the compared result of the DMA comparator 106.

A host 200 is connected to the defect areas management apparatus to send write/read commands to the microcomputer 100 through a host interface 108 of the defect areas management apparatus. The host 200 also sends the data to be written, to the encoder 107 and receives the read data from the decoder 103.

The PID decoder 104 is provided separately from the decoder 103, as shown in FIG. 4. Alternatively, the PID decoder 104 may be included in the decoder 103. The PID is provided in a header field of each sector to indicate an address of the corresponding sector.

In the first embodiment of the present invention with the above-mentioned construction, the components other than the microcomputer 100, or the encoder 107, decoder 103 and DMA comparator 106 are adapted to perform the management of defect areas registered in a PDL and SDL to reduce a load amount of the microcomputer 100.

In detail, the host 200 sends a write or read command to the microcomputer 100 through the host interface 108. At this time, the write or read command from the host 200 includes a logical sector number (LSN) indicative of a position to be written or read and a transfer length indicative of a data size. If the host 200 sends the write command to the microcomputer 100, then it sends data to be written, to the encoder 107 through the interface 108. The microcomputer 100 converts the LSN included in the write or read command from the host 200 into a PSN and controls the data writing encoder 107 or data reading decoder 103 in accordance with the compared result of the DMA comparator 106. As a result, the encoder 107 or decoder 103 writes data in a desired sector or reads data therefrom through the servo 102 and optical pickup 101 in response to a write or read control signal from the microcomputer 100.

For the writing/reading of data, the servo 102 is first operated under the control of the microcomputer 100 to move the optical pickup 101 to a start PSN. At this time, the PID decoder 104 decodes a PID of a position being currently traced by the optical pickup 101 and outputs the resultant physical sector number of the current position to the DMA comparator 106.

The DMA comparator 106 compares the physical sector number of the current position from the PID decoder 104 with a physical sector number stored in the DMA data storage unit 105 which is provided with a memory device, to determine whether a sector of the current position is a defect sector registered in the PDL or SDL.

Figure 8A:
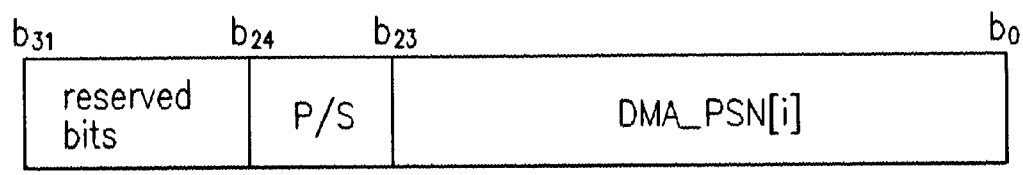
FIG. 8a a view showing a structure of a register in each of the DMA comparators in FIGS. 4 and 5.

As shown in FIG. 8a, the DMA comparator 106 is provided with a 32-bit register which stores 23 bits indicative of a physical sector number DMA_PSN[i] of a defect area, one bit for discrimination between the PDL and the SDL and 8 reserved bits.

The physical sector number DMA_PSN[i] of the register in the comparator 106 is updated under the control of the microcomputer 100. Namely, if a physical sector number of a position being currently traced by the optical pickup 101 is the same as a physical sector number DMA_PSN[i] of a defect area, this physical sector number DMA_PSN[i] is updated to the subsequent one of physical sector numbers of defect areas sequentially stored in the DMA storage unit 105.

Figure 8B:
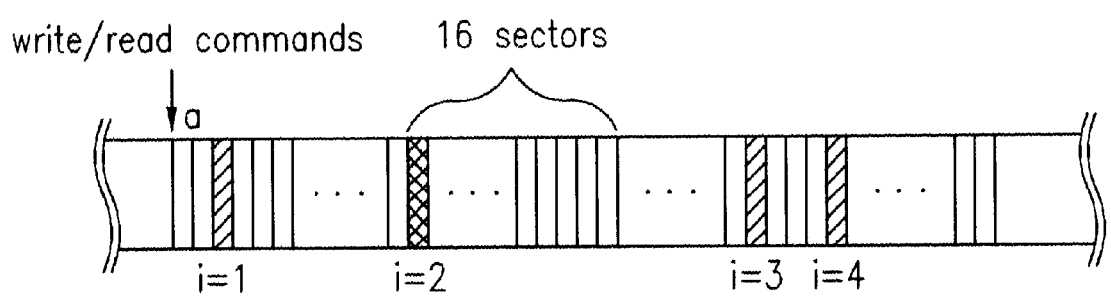

For example, as shown in FIG. 8b, in the case where a write or read command is applied to perform a write or read operation beginning with a position "a", a physical sector number DMA_PSN[1] of a defect area at a position i=1 is stored in the register of the DMA comparator 106. At this time, one bit assigned in the registered is used to indicate that the current sector is a defect sector registered in the PDL. Thereafter, when a physical sector number of the current position detected by the PID decoder 104 become the same as the physical sector number of the defect area stored in the register as the write or read operation is advanced, the register is updated to a physical sector number DMA_PSN[2] of a defect area at a position i=2. At this time, one bit assigned in the register is used to indicate that the current sector is a defect sector registered in the SDL. Here, the physical sector number DMA_PSN[2] of the defect sector at the position i=2 is a sector number of a first sector in a defect block registered in the SDL. In this manner, the physical sector number of the register is updated.

The DMA comparator 106 may provide its output signal to the microcomputer 100 as shown in FIG. 4 or the encoder 107 and decoder 103.

In the case where the DMA comparator 106 provides its output signal to the microcomputer 100, this microcomputer 100 controls the data write/read operations with respect to a sector of the current position in response to the output signal from the DMA comparator 106. Namely, if a physical sector number of a position being currently traced by the optical pickup 101 is the same as a physical sector number stored in the register of the DMA comparator 106 and the corresponding sector is a defect sector registered in the PDL, the microcomputer 100 outputs a write or read inhibit signal to the encoder 107 or decoder 103 to inhibit data from being written or read on the defect sector. For the write operation, the encoder 107 does not write the encoded data in the defect sector in response to the write inhibit signal from the microcomputer 100. At this time, no LSN is assigned to the defect sector in which no data is written. As a result, the defect sector is jumped over by the slipping replacement method. For the read operation, the decoder 103 does not read data from the defect sector in response to the read inhibit signal from the microcomputer 100. On the other hand, if the current sector is a defect sector registered in the SDL, the microcomputer 100 controls the servo 102 to replace the current area with a spare area according to the linear replacement method.

On the other hand, if the physical sector number of the position being currently traced by the optical pickup 101 is not the same as the physical sector number stored in the register of the DMA comparator 106, this signifies that the corresponding sector has no defect. As a result, the microcomputer 100 outputs a write or read signal to the encoder 107 or decoder 103 to write or read data on the current sector traced by the optical pickup 101.

On the other hand, in the case where the DMA comparator 106 provides its output signal to the encoder 107 and decoder 103, the encoder 107 and decoder 103 themselves control the data write/read operations with respect to the corresponding sector in accordance with the compared result of the DMA comparator 106. In this case, the microcomputer 100 outputs only a start PSN and a transfer length included in the write or read command sent from the host 200 to the encoder 107 or decoder 103.

In other words, if a physical sector number of a position being currently traced by the optical pickup 101 is the same as a physical sector number stored in the register of the DMA comparator 106 and the corresponding sector is a defect sector registered in the PDL, the encoder 107 or decoder 103 does not write or read data on the defect sector. On the other hand, if the current sector is a defect sector registered in the SDL, the encoder 107 or decoder 103 controls the servo 102 to replace the current area with a spare area according to the linear replacement method.

On the other hand, if the physical sector number of the position being currently traced by the optical pickup 101 is not the same as the physical sector number stored in the register of the DMA comparator 106, this signifies that the corresponding sector has no defect. As a result, the encoder 107 or decoder 103 writes or reads data on the current sector traced by the optical pickup 101.

Figure 5:
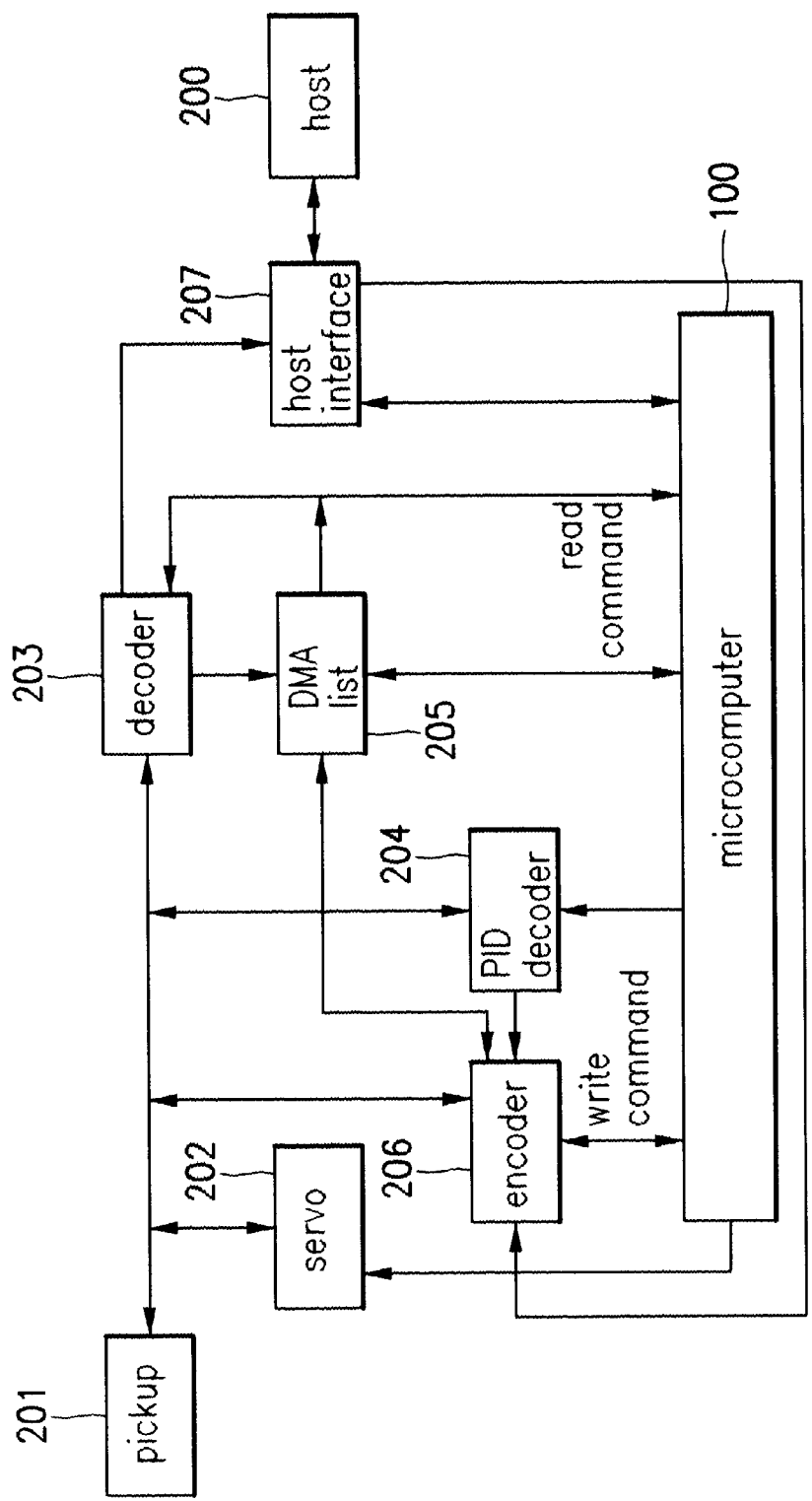
FIG. 5 is a block diagram showing another example of an apparatus for managing defect areas of an optical recording medium in accordance with the first embodiment of the present invention, in which comparators are included respectively in an encoder a decoder.

FIG. 5 is a block diagram showing another example of an apparatus for managing defect areas of an optical recording medium in accordance with the first embodiment of the present invention, in which DMA comparators are included respectively in an encoder 206 and decoder 203 and the management of defect areas is performed by the encoder 206 and decoder 203. The construction of FIG. 5 is substantially the same as that of FIG. 4, with the exception that the encoder 206, decoder 203 and DMA comparators are different in construction from those in FIG. 4. Similarly to that in FIG. 4, a PID decoder 204 may be provided separately from the decoder 203 or included in the decoder 203. Further, each of the DMA comparators in the encoder 206 and decoder 203 is provided with the register which has the structure as shown in FIG. 8a and is updated as shown in FIG. 8b.

That is, the encoder 206 and decoder 203 control the data write/read operations with respect to the current sector in accordance with the compared results of the DMA comparators therein, respectively. In this case, the microcomputer 100 outputs only a start PSN and a transfer length included in the write or read command sent from the host 200 to the encoder 206 or decoder 203.

If a physical sector number of a position being currently traced by an optical pickup 201 is the same as a physical sector number stored in the register of each DMA comparator and the corresponding sector is a defect sector registered in the PDL, the encoder 206 or decoder 203 does not write or read data on the defect sector. On the other hand, if the current sector is a defect sector registered in the SDL, the encoder 206 or decoder 203 controls a servo 202 to replace the current area with a spare area according to the linear replacement method.

Figure 6:
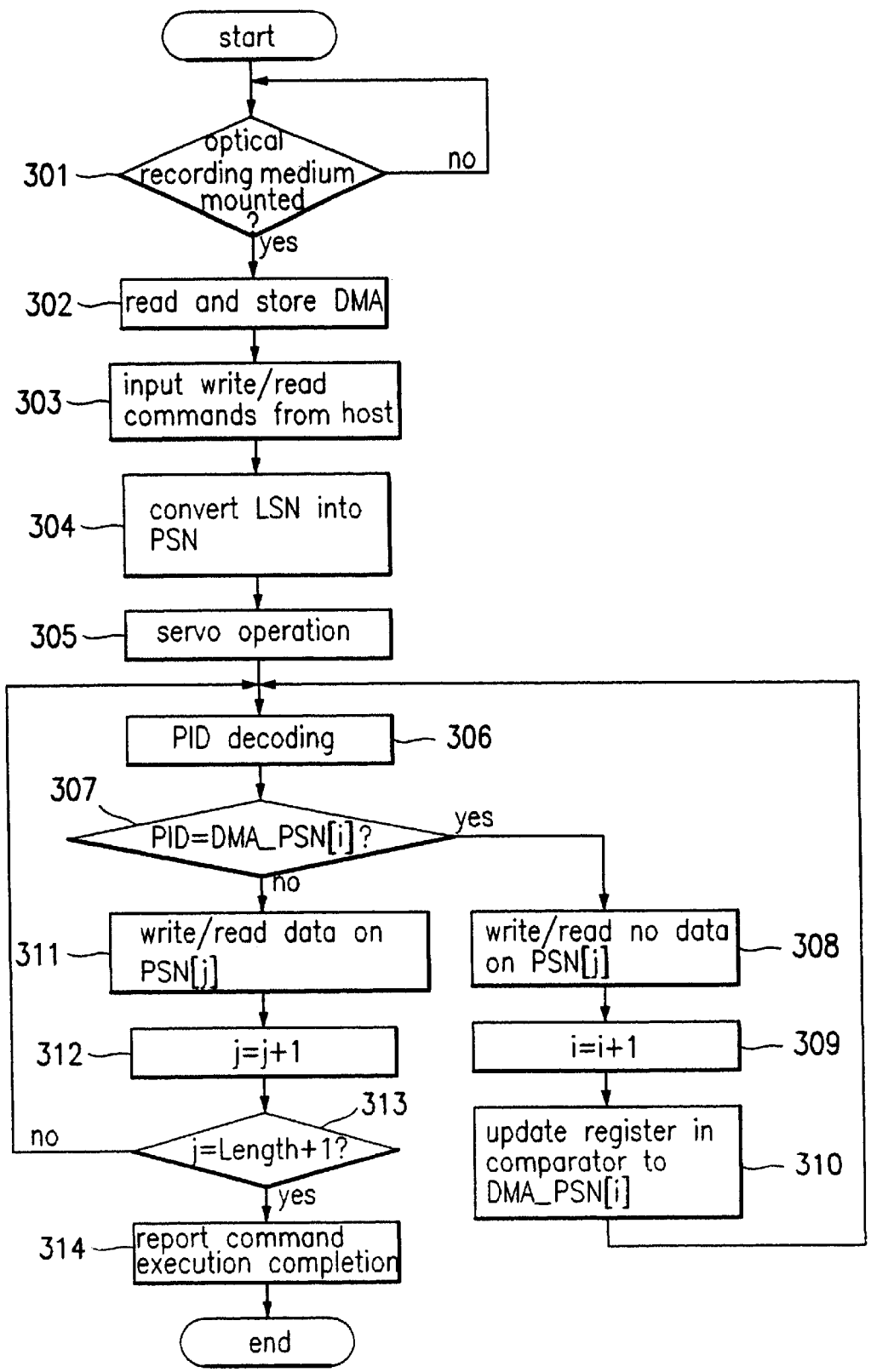
FIG. 6 is a flowchart illustrating an operation of the defect areas management apparatus in FIG. 5 which manages defect areas registered in a PDL.

FIG. 6 is a flowchart illustrating an operation of the defect areas management apparatus in FIG. 5 which manages defect areas registered in the PDL.

First, at step 301, the microcomputer 100 determines whether an optical recording medium has been mounted and discriminates the type of the optical recording medium if it has been mounted. In this case, the microcomputer 100 determines the mounting of the optical recording medium according to the level of a high-frequency signal which is detected during the focusing operation of the optical pickup. Further, the microcomputer 100 discriminates the type of the optical recording medium by comparing the level of a tracking signal which is detected while the optical pickup moves toward tracks of the optical recording medium and then returns to the original position, with a predetermined signal level. Namely, as a result of the comparison, the microcomputer 100 determines whether the optical recording medium is of a rewritable type.

If it is determined at the above step 301 that the rewritable optical recording medium has been mounted, the microcomputer 100 reads DMA information registered in lead-in and lead-out areas of the rewritable optical recording medium and stores the read DMA information in a DMA data storage unit 205 at step 302. However, if it is determined at the above step 301 that the rewritable optical recording medium has not been mounted, the microcomputer 100 maintains the initial state.

Upon inputting a write or read command from the host 200 at step 303, the microcomputer 100 converts an LSN included in the inputted write or read command into a PSN at step 304. The microcomputer 100 outputs its write command to the encoder 206 upon inputting the write command from the host 200 and its read command to the decoder 203 upon inputting the read command from the host 200.

Noticeably, the write/read commands from the host 200 are somewhat different from the write/read commands from the microcomputer 100. Namely, the write or read command from the host 200 includes an LSN indicative of a position of the optical recording medium to be written or read and a transfer length indicative of a data size, and the write or read command from the microcomputer 100 includes a PSN indicative of a position of the optical recording medium to be written or read and a transfer length indicative of a data size.

Under the control of the microcomputer 100, the encoder 206 or decoder 203 reads a PSN (i.e., DMA_PSN[i], i=1) of a first defect area subsequent to the above PSN, from the DMA data storage unit 205 and stores the read PSN in the register of the DMA comparator therein. At this time, one bit assigned in the register is used to indicate that the current sector is a defect sector registered in the PDL or SDL.

Upon receiving the write command from the microcomputer 100, the encoder 206 encodes data from the host 200 into a format desired by the optical recording medium.

The servo 202 is operated under the control of the microcomputer 100 at step 305 to move the optical pickup 201 to a desired PSN. At this time, the PID decoder 204 decodes a PID of a position being currently traced by the optical pickup 201 and outputs the resultant physical sector number of the current position to the encoder 206 or decoder 203 at step 306.

The PID is provided in a header field of each sector to indicate an address of the corresponding sector.

In the case where the microcomputer 100 generates the write command, the encoder 206 determines at step 307 whether the physical sector number from the PID decoder 204 is the same as the physical sector number DMA_PSN[i] stored in its internal register.

If the physical sector number from the PID decoder 204 is the same as the physical sector number stored in the register, this signifies that a defect is present in a position being traced by the optical pickup 201, namely, a sector PSN[j] in which jth data is to be written. If the sector PSN[j] is a defect sector registered in the PDL, the encoder 206 does not write the jth data in the defect sector PSN[j] at step 308. At this time, no LSN is assigned to the defect sector PSN[j] in which no data is written. As a result, the defect sector PSN[j] is jumped over by the slipping replacement method.

Then, the internal register of the encoder 206 as shown in FIG. 8a is updated to the subsequent one (i.e., DMA_PSN[i], i=i+1) of physical sector numbers of defect areas sequentially stored in the DMA storage unit 205 at steps 309 and 310, as shown in FIG. 8b.

Because the defect sector is jumped over, the optical pickup 201 moves to a sector subsequent thereto. The PID decoder 204 decodes a PID of a position being currently traced by the optical pickup 201 and outputs the resultant physical sector number of the current position to the encoder 206 at step 306.

Then, the encoder 206 determines at step 307 whether the physical sector number from the PID decoder 204 is the same as the physical sector number DMA_PSN[i] updated in its internal register.

If the physical sector number from the PID decoder 204 is the same as the physical sector number updated in the register, the operation proceeds to steps 308–310 to sequentially perform them. On the other hand, in the case where the physical sector number from the PID decoder 204 is not the same as the physical sector number updated in the register at the above step 307, this signifies that no defect is present in a sector PSN[j] at the position traced by the optical pickup 201. As a result, the encoder 206 writes the encoded jth data in the sector PSN[j] at step 311.

Then, the microcomputer 100 increments a value j by one at step 312 and determines at step 313 whether the incremented value j is equal to a value obtained by incrementing the transfer length included in the write command from the host 200 by one.

Here, the value j is the number of sectors in which data is to be written. If the value j is equal to the value obtained by incrementing the transfer length by one, this signifies that the write command from the host 200 has completely been performed. As a result, the microcomputer 100 reports the command execution completion to the host 200 at step 314. In other words, because the write command from the host 200 includes an LSN and a transfer length indicative of a data size, data of the size corresponding to the transfer length must be written on the optical recording medium. For example, in the case where the host 200 generates the write command to write data in 100 sectors, the write operation must be performed to write the data in 100 normal sectors while jumping over defect sectors. In this connection, the value j is incremented by one only when data is written in a sector.

Accordingly, if it is determined at the above step 313 that the incremented value j is smaller than the value obtained by incrementing the transfer length included in the write command from the host 200 by one, this signifies that the write command from the host 200 is not completed. As a result, the operation returns to the above step 306 to repeat the above-mentioned steps.

On the other hand, in the case where the microcomputer 100 generates the read command, the decoder 203 performs the above-mentioned operation to read data written on the optical recording medium. That is, the associated physical sector number DMA_PSN[i] from the DMA data storage unit 205 is stored in the internal register of the decoder 203. Upon inputting the read command from the microcomputer 100, the decoder 203 compares a physical sector number from the PID decoder 204, corresponding to a position being currently traced by the optical pickup, with the physical sector number DMA_PSN[i] stored in its internal register. At this time, if the two physical sector numbers are the same, the decoder 203 does not read data from a sector of the current position and updates its internal register in the above-mentioned manner. However, if the two physical sector numbers are not the same, the decoder 203 reads jth data from a sector corresponding to the PID. Then, the microcomputer 100 increments a value j by one and compares the incremented value j with a value obtained by incrementing the transfer length included in the read command from the host 200 by one.

Figure 7:
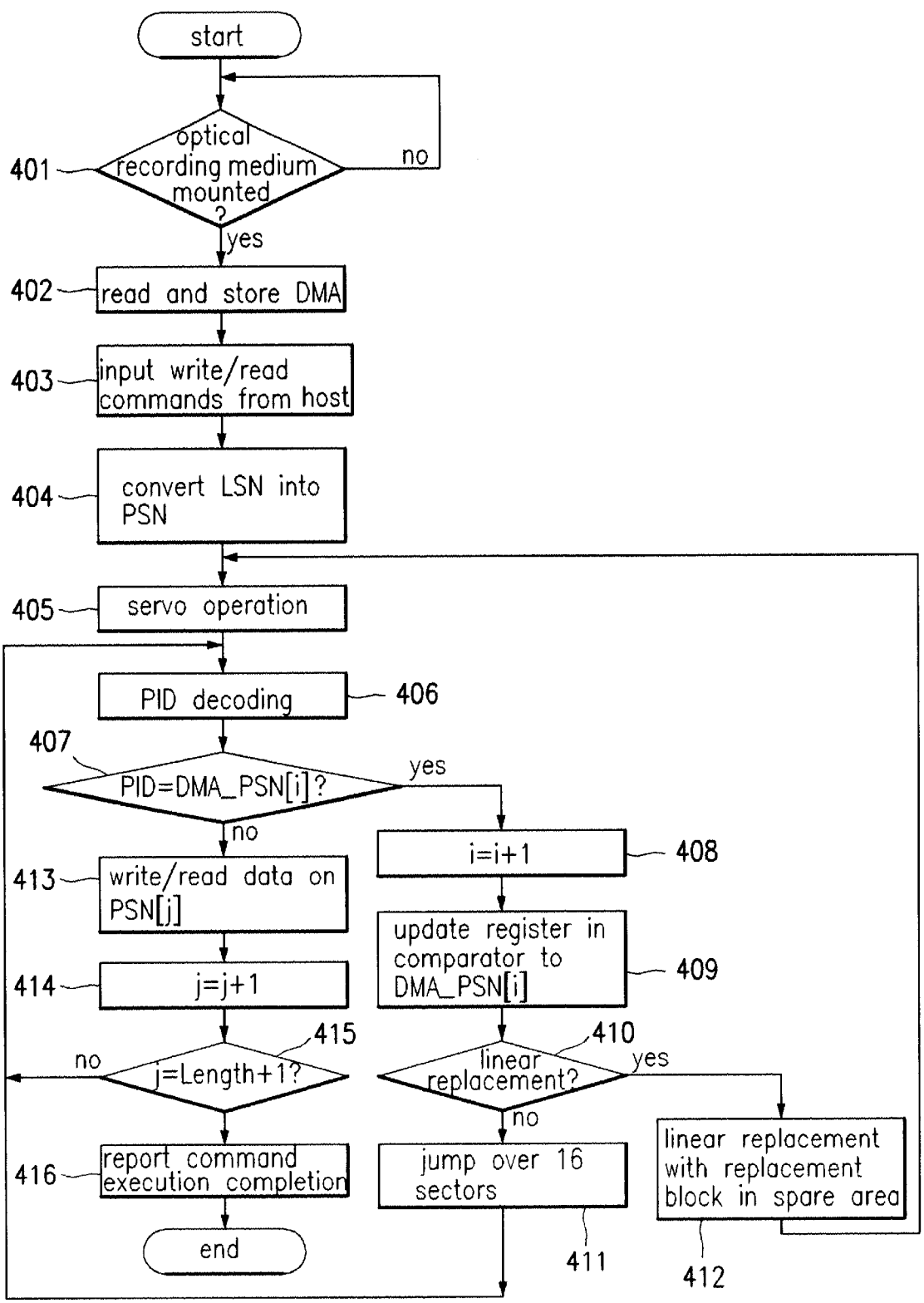
FIG. 7 is a flowchart illustrating an operation of the defect areas management apparatus in FIG. 5 which manages defect areas registered in an SDL.

FIG. 7 is a flowchart illustrating an operation of the defect areas management apparatus in FIG. 5 which manages defect areas registered in the SDL. In this operation, data of a defect block registered in the SDL may be written in a normal block in a spare area by the linear replacement method or in a normal block subsequent to the defect block while it is jumped over, by the slipping replacement method.

Namely, the operation of the FIG. 7 is performed when a physical sector number of a position being currently traced by the optical pickup 201 becomes the same as a physical sector number of a defect area stored in the register of the encoder 206 or decoder 203 as the write or read operation is advanced and the corresponding sector is a defect sector registered in the SDL. Therefore, the write/read operations of FIG. 7 are performed by the encoder 206 and decoder 203 in the same manner as those of FIG. 6, except for steps 410–412.

Accordingly, similarly to FIG. 6, as shown in FIG. 7, if an optical recording medium is mounted at step 401, the microcomputer 100 reads DMA information registered in lead-in and lead-out areas of the optical recording medium and stores the read DMA information in the DMA data storage unit 205 at step 402. Upon inputting a write or read command from the host 200 at step 403, the microcomputer 100 converts an LSN included in the inputted write or read command, into a PSN at step 404. Under the control of the microcomputer 100, the encoder 206 or decoder 203 reads a physical sector number (i.e., DMA_PSN[I], I=1) of a first defect area subsequent to the above PSN, from the DMA data storage unit 205 and storage the read physical sector number in the register of the DMA comparator therein. At this time, one bit assigned in the register is used to indicate that the current sector is a defect sector registered in the PDL and SDL.

The servo 202 is operated under the control of the microcomputer 100 at step 405 to move the optical pickup 201 to a desired PSN. At this time, the PID decoder 204 decodes a PID of a position being currently traced by the optical pickup 201 and outputs the resultant physical sector number of the current position to the encoder 206 or decoder 203 at step 406.

In the case where the microcomputer 100 generates the write command, the encoder 206 encodes data from the host 200 into a format desired by the optical recording medium and then determines at step 407 whether the physical sector number from the PID decoder 204 is the same as the physical sector number DMA_PSN[i] stored in its internal register.

If the physical sector number from the PID decoder 204 is the same as the physical sector number stored in the register and the corresponding sector is a defect sector registered in the SDL, this signifies that a defect is present in a position being traced by the optical pickup 201, namely, a sector PSN[j] in which jth data is to be written. As a result, the microcomputer 100 updates the internal register of the encoder 206 as shown in FIG. 8a to the subsequent one (i.e., DMA_PSN[i], i=i+1) of physical sector numbers of defect areas sequentially stored in the DMA storage unit 205 at steps 408 and 409, as shown in FIG. 8b. Noticeably, only a first sector in a defect block is registered in the SDL and the subsequent 15 sectors are not registered in the SDL. Similarly, only a physical sector number of the first sector in the defect block is stored in the DMA data storage unit 205. This signifies that the subsequent 15 sectors are regarded as defect sectors together with the sector registered in the SDL. Hence, a physical sector number of the subsequent defect area updated in the register is not a physical sector number of a second sector in the defect block registered in the SDL but a physical sector number of a first sector in the subsequent defect block registered in the SDL or a physical sector number of a defect sector registered in the PDL.

The linear replacement method and slipping replacement method are proposed to manage defect blocks registered in the SDL. The linear replacement method is to write data to be written in a defect block, in a replacement block in a spare area. The slipping replacement method is to write the data to be written in the defect block, in a normal block subsequent to the defect block while jumping over it.

After performing the above step 409, the microcomputer 100 determines at step 410 whether the defect block is to be replaced by the linear replacement method.

If it is determined at the above step 410 that the defect block is not to be replaced by the linear replacement method, this signifies that the defect block is to be replaced by the slipping replacement method. As a result, the encoder 206 does not write data in the 16 sectors including the defect sector while jumping over them at step 411.

If it is determined at the above step 410 that the defect block is to be replaced by the linear replacement method, the servo 202 is operated under the control of the microcomputer 100, and the encoder 206 writes the data of the defect block in a replacement block in a spare area at step 412.

After the slipping replacement method is performed at step 411 or after the linear replacement method is performed at step 412, the optical pickup 201 traces a first sector of a block subsequent to the defect block.

The PID decoder 204 decodes a PID of a position being currently traced by the optical pickup 201 and outputs the resultant physical sector number of the current position to the encoder 206 at step 406.

Then, the encoder 206 determines at step 407 whether the physical sector number from the PID decoder 204 is the same as the physical sector number DMA_PSN[i] updated in its internal register.

If the physical sector number from the PID decoder 204 is the same as the physical sector number updated in the register, the operation proceeds to steps 408–412 to sequentially perform them. On the other hand, in the case where the physical sector number from the PID decoder 204 is not the same as the physical sector number updated in the register at the above step 407, this signifies that no defect is present in a sector PSN[j] at the position traced by the optical pickup 201. As a result, the encoder 206 writes the encoded jth data in the sector PSN[j] at step 413.

Then, the microcomputer 100 increments a value j by one at step 414 and determines at step 415 whether the incremented value j is equal to a value obtained by incrementing the transfer length included in the write command from the host 200 by one. Here, the value j is defined in the same manner as that in FIG. 6.

If the value j is equal to the value obtained by incrementing the transfer length by one, this signifies that the write command from the host 200 has completely been performed. As a result, the microcomputer 100 reports the command execution completion to the host 200 at step 416.

If it is determined at the above step 415 that the incremented value j is smaller than the value obtained by incrementing the transfer length included in the write command from the host 200 by one, this signifies that the write command from the host 200 is not completed. As a result, the operation returns to the above step 406 to repeat the above-mentioned steps. On the other hand, if it is determined at the above step 410 that the defect block is to be replaced by the slipping replacement method, the above steps 406–416 are repeated to write data in a normal block subsequent to the defect block.

On the other hand, in the case where the microcomputer 100 generates the read command, the decoder 203 performs the above-mentioned operation to read data written on the optical recording medium. That is, if a physical sector number from the PID decoder 204, corresponding to a position being currently traced by the optical pickup, is the same as the physical sector number DMA_PSN[i] stored in the register in the decoder 203 and the corresponding defect block is to be replaced by the slipping replacement method, the decoder 203 reads data from a normal block subsequent to the defect block. If the defect block is to be replaced by the linear replacement method, the decoder 203 reads data from a corresponding replacement block in a spare area. In the case where the physical sector number of the position being currently traced by the optical pickup is not the same as the physical sector number DMA_PSN[i] stored in the register, the decoder 203 reads data from a physical sector of the current position.

In other words, the above-mentioned operation of FIG. 6 is performed in the case where a physical sector number of a position being currently traced by the optical pickup 201 is the same as a physical sector number of a defect area stored in the register of the encoder 206 or decoder 203 and the corresponding sector is a defect sector registered in the PDL, and the above-mentioned operation of FIG. 7 is performed in the case where a physical sector number of a position being currently traced by the optical pickup 201 is the same as a physical sector number of a defect area stored in the register of the encoder 206 or decoder 203 and the corresponding sector is a defect sector registered in the SDL.

As mentioned above, in the first embodiment of the present invention, the components other than the microcomputer 100, or the DMA comparator and encoder or decoder are adapted to determine whether a physical sector number of a position being currently traced by the optical pickup corresponds to a defect area registered in a DMA. Then, the encoder or decoder performs the management of the defect area in accordance with the determined result.

Second Embodiment

In a second embodiment of the present invention, a microcomputer is adapted to compare a physical sector number of a position being currently traced by an optical pickup with a physical sector number of a defect area registered in a DMA and perform the management of the defect area in accordance with the compared result.

Figure 9:
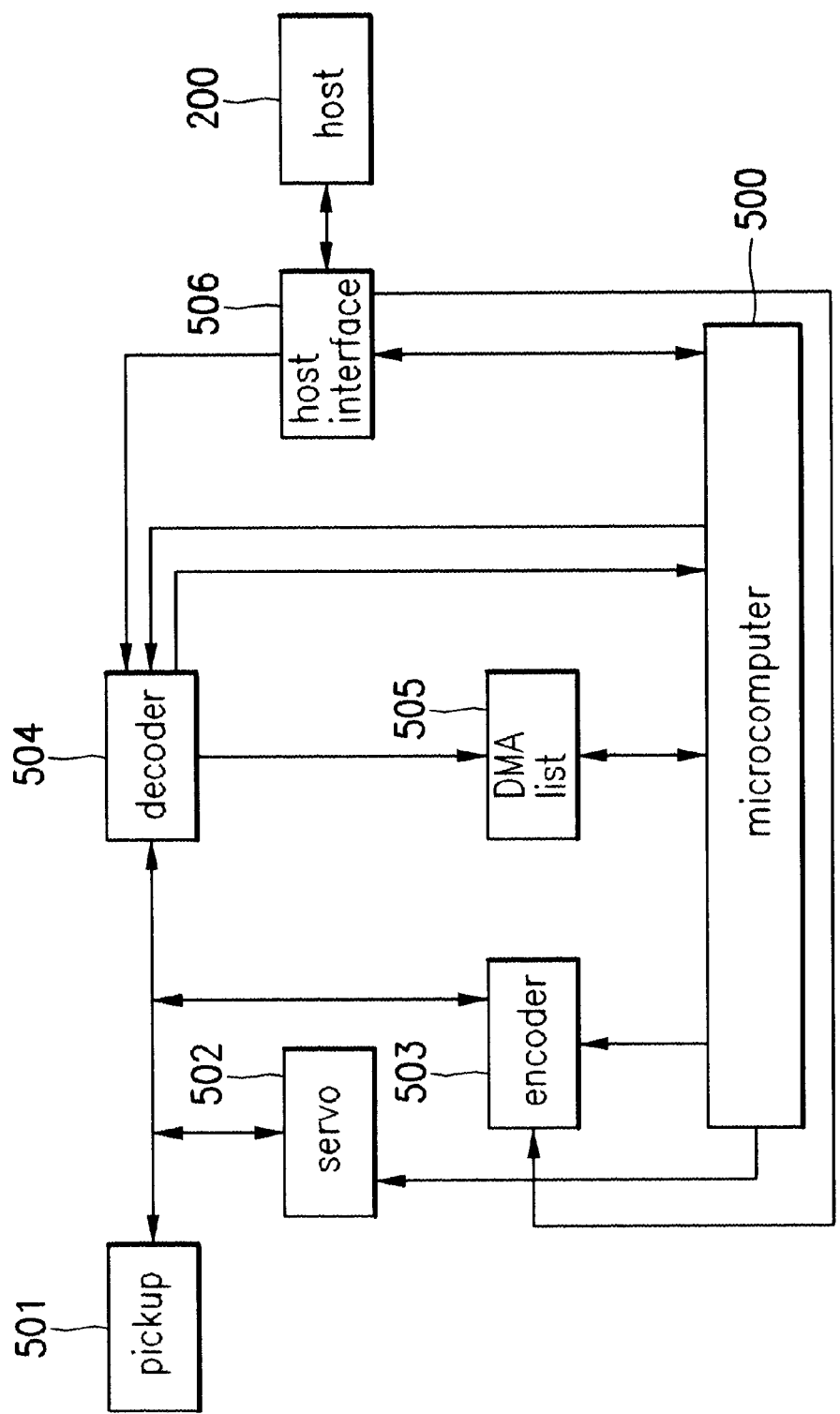
FIG. 9 is a block diagram showing the construction of an apparatus for managing defect areas of an optical recording medium in accordance with a second embodiment of the present invention, in which a DMA comparator is included in a microcomputer.

With reference to FIG. 9, there is shown in block form the construction of an apparatus for managing defect areas of an optical recording medium in accordance with the second embodiment of the present invention. As shown in this drawing, the defect areas management apparatus comprises an optical pickup 501 for writing and reading data on the optical recording medium, a servo 502 for performing focusing and tracking operations of the optical pickup 501, an encoder 503 responsive to a write control signal for encoding data into a format desired by the optical recording medium and writing the encoded data on the optical recording medium through the optical pickup 501, and a decoder 504 responsive to a read control signal for reading the data written on the optical recording medium and decoding the read data into the original format. The decoder 504 is also adapted to decode a PID of a position being currently traced by the optical pickup 501 to generate a physical sector number of the current position. The defect areas management apparatus further comprises a DMA data storage unit 505 for reading DMA information written on lead-in and lead-out areas of the optical recording medium and storing the read DMA information, and a microcomputer 500 for comparing the physical sector number from the decoder 504 with a PSN of a defect area stored in the DMA data storage unit 505 and outputting the write or read signal to the encoder 503 or the decoder 504 in accordance with the compared result.

A host 200 is connected to the defect areas management apparatus to send write/read commands to the microcomputer 500 through a host interface 506 of the defect areas management apparatus. The host 200 also sends the data to be written, to the encoder 503 and receives the read data from the decoder 504.

The PID decoding is performed by the decoder 504. Alternatively, the PID decoding may be performed by a PID decoder provided separately from the decoder 504.

Figure 10:
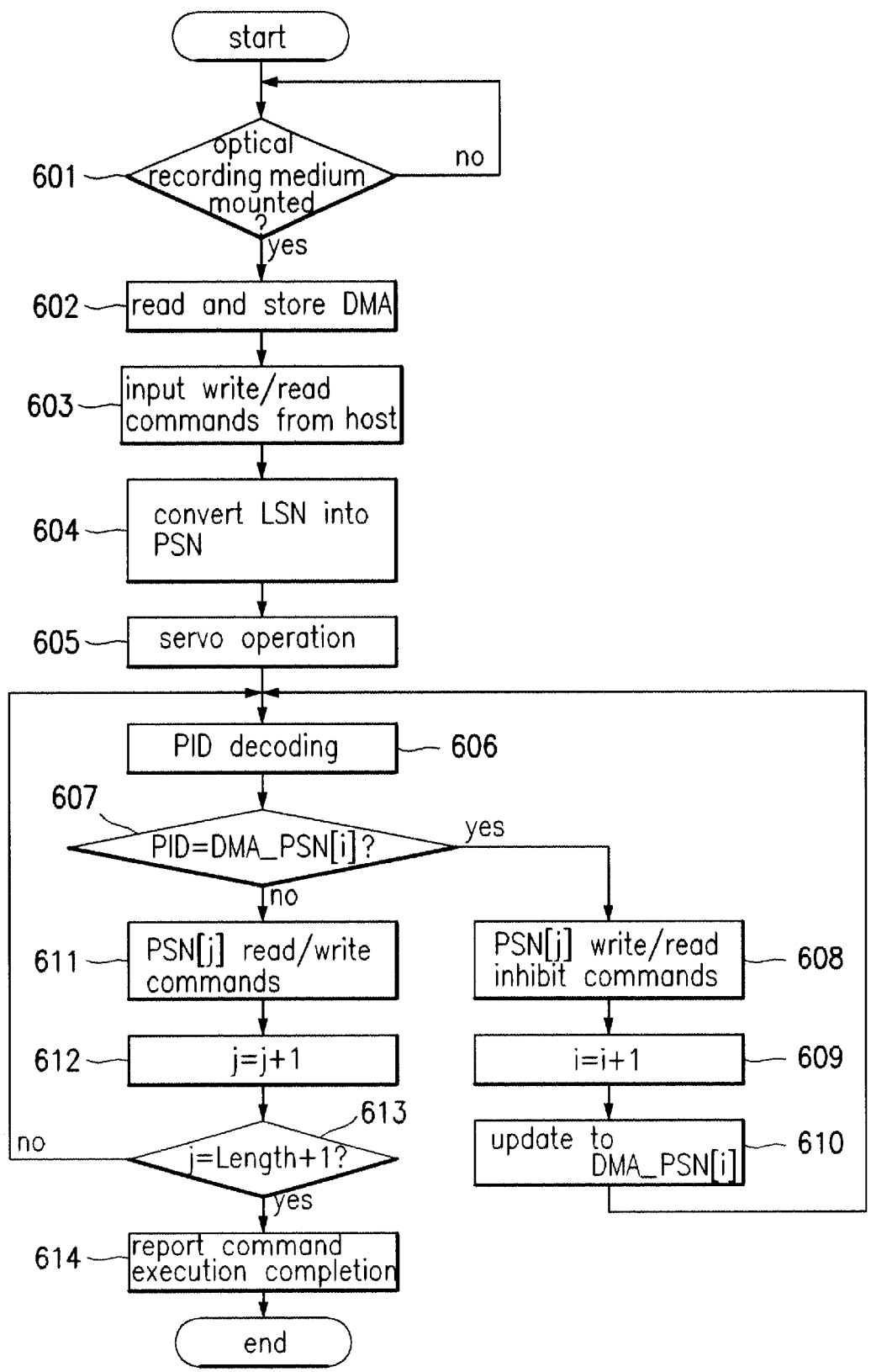
FIG. 10 is a flowchart illustrating an operation of the defect areas management apparatus in FIG. 9 which manages defect areas registered in a PDL.
Figure 11:
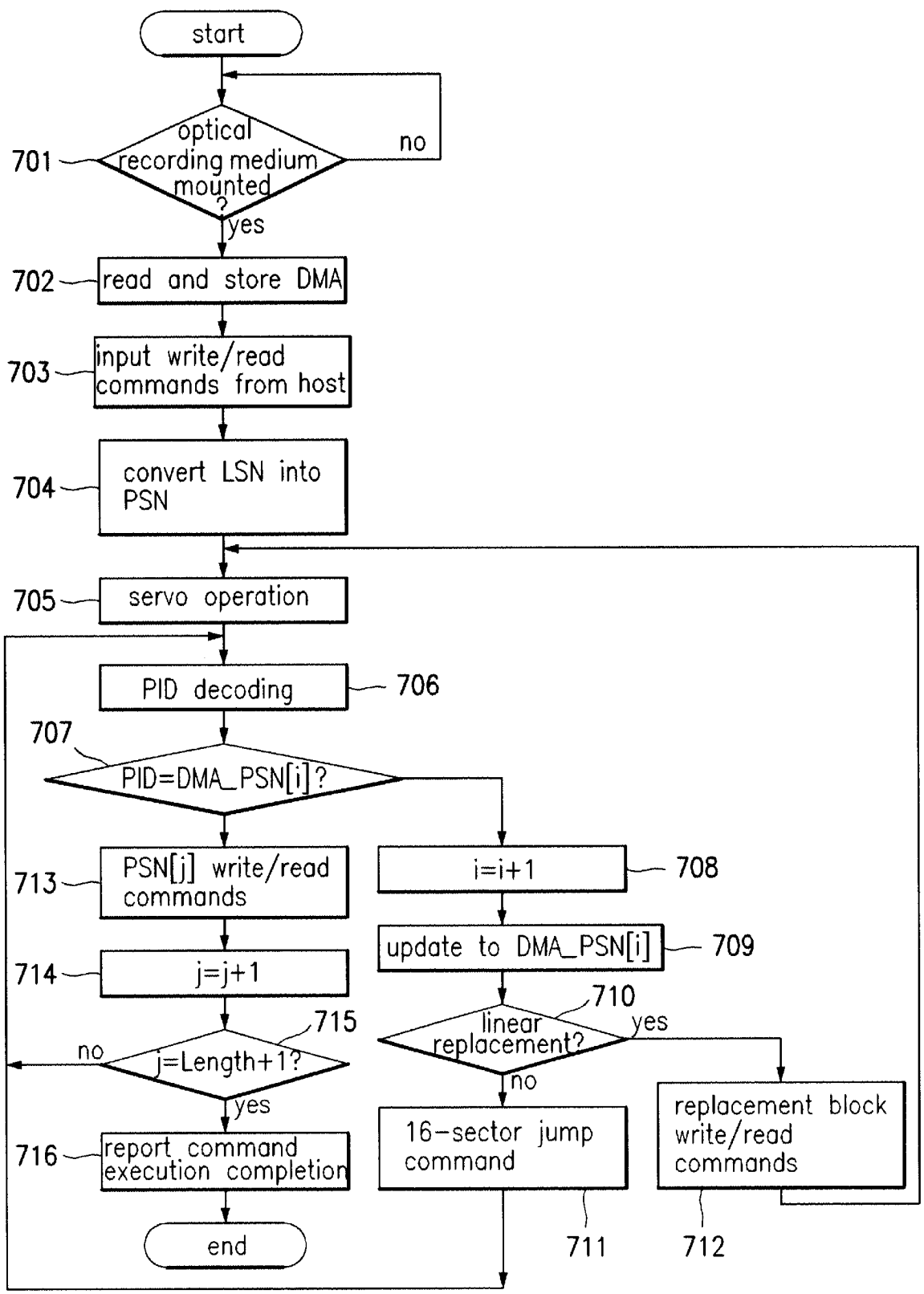
FIG. 11 is a flowchart illustrating an operation of the defect areas management apparatus in FIG. 9 which manages defect areas registered in an SDL.

FIG. 10 is a flowchart illustrating an operation of the defect areas management apparatus in FIG. 9 which manages defect areas registered in a PDL and FIG. 11 is a flowchart illustrating an operation of the defect areas management apparatus in FIG. 9 which manages defect areas registered in an SDL.

In the second embodiment of the present invention with the above-mentioned construction, the microcomputer 500 is adapted to perform the management of defect areas registered in the PDL and SDL. Namely, the microcomputer 500 determines the writing or reading of the current sector and outputs the write or read control signal to the encoder 503 or decoder 504 in accordance with the determined result. The encoder 503 writes or does not write data in the current sector in response to the write control signal from the microcomputer 500, and the decoder 504 reads or does not read data from the current sector in response to the read control signal from the microcomputer 500.

In detail, the host 200 sends the write or read command to the microcomputer 500 through the host interface 506. If the host 200 sends the write command to the microcomputer 500, then it sends data to be written, to the encoder 503 through the interface 506. The microcomputer 500 manages defect areas registered in the PDL and SDL while performing the command from the host 200. Upon completing the command execution, the microcomputer 500 reports the command execution completion to the host 200.

The operation of FIG. 10 is performed in the case where a physical sector number of a position being currently traced by the optical pickup 501 is the same as a physical sector number of a defect area stored in a register and it corresponds to a defect sector registered in the PDL, and the operation of FIG. 11 is performed in the case where a physical sector number of a position being currently traced by the optical pickup 501 is the same as a physical sector number of a defect area stored in the register and it corresponds to a defect sector registered in the SDL.

The operation of managing defect areas registered in the PDL will hereinafter be described in detail with reference to FIG. 10. The operation of FIG. 10 is partially the same as that of FIG. 6. Therefore, only a difference of the operation of FIG. 10 from that of FIG. 6 will hereinafter be described.

First, upon inputting the write command from the host 500 at step 603, the microcomputer 500 converts an LSN included in the inputted write command into a PSN at step 604. Then, the microcomputer 500 reads a physical sector number DMA_PSN[i] of a first defect area subsequent to the above PSN, from the DMA data storage unit 505 and stores the read physical sector number in its internal memory. The internal memory of the microcomputer 500 may have a structure of various types. For example, as shown in FIG. 8a, the internal memory of the microcomputer 500 may be composed of a region for storage of a physical sector number DMA_PSN[i] of a defect area, and a region for discrimination between the PDL and the SDL.

The servo 502 is operated under the control of the microcomputer 500 at step 605 to move the optical pickup 501 to a desired PSN. At this time, the decoder 504 decodes a PID of a position being currently traced by the optical pickup 501 and outputs the resultant physical sector number of the current position to the microcomputer 500 at step 606. Then, the microcomputer 500 determines at step 607 whether the physical sector number from the decoder 504 is the same as the physical sector number DMA_PSN[i] stored in its internal memory.

If the physical sector number from the decoder 504 is the same as the physical sector number stored in the memory and it corresponds to a defect area registered in the PDL, the microcomputer 500 outputs a write inhibit signal to the encoder 503 at step 608 to inhibit it from writing jth data in a sector PSN[j]. The encoder 503 does not write the encoded data in the sector PSN[j] in response to the write inhibit signal from the microcomputer 500. At this time, no LSN is assigned to the defect sector PSN[j] in which no data is written. As a result, the defect sector PSN[j] is jumped over by the slipping replacement method.

Then, the internal memory of the microcomputer 500 is updated to the subsequent one (i.e., DMA_PSN[i], i=i+1) of physical sector numbers of defect areas sequentially stored in the DMA storage unit 505 at steps 609 and 610.

On the other hand, in the case where the physical sector number from the decoder 504 is not the same as the physical sector number stored in the memory at the above step 607, the microcomputer 500 outputs a write signal to the encoder 503 at step 611 to permit it to write data in the sector PSN[j] of the current position. Upon receiving the write signal from the microcomputer 500, the encoder 503 writes the encoded jth data in the sector PSN[j] through the servo 502 and optical pickup 501.

Then, the microcomputer 500 increments a value j by one at step 612 and determines at step 613 whether the incremented value j is equal to a value obtained by incrementing the transfer length included in the write command from the host 200 by one. If the value j is equal to the value obtained by incrementing the transfer length by one, the microcomputer 500 reports command execution completion to the host 200 at step 614. If it is determined at the above step 613 that the incremented value j is smaller than the value obtained by incrementing the transfer length included in the write command from the host 200 by one, the operation returns to the above step 606 to repeat the above-mentioned steps.

On the other hand, in the case where the microcomputer 500 receives the read command from the host 200, it sequentially performs the above-mentioned steps to output a read inhibit signal or a read signal to the decoder 504. As a result, the decoder 504 reads or does not read data written on the optical recording medium in response to the read signal or read inhibit signal from the microcomputer 500.

The operation of managing defect areas registered in the SDL will hereinafter be described in detail with reference to FIG. 11. The operation of FIG. 11 is partially the same as that of FIG. 7. Therefore, only a difference of the operation of FIG. 11 from that of FIG. 7 will hereinafter be described. The operation of the FIG. 11 is performed when a physical sector number of a position being currently traced by the optical pickup 501 is the same as a physical sector number of a defect area stored in the internal memory of the microcomputer 500 and it corresponds to a defect sector registered in the SDL. Therefore, the write/read operations of FIG. 11 are performed in the same manner as those of FIG. 10, except for steps 710–712.

After performing steps 701–706 in the same manner as those of FIG. 10, the microcomputer 500 determines at step 707 whether a physical sector number from the decoder 504 is the same as a physical sector number DMA_PSN[i] of a defect area stored in its internal memory.

If the physical sector number from the decoder 504 is the same as the physical sector number stored in the internal memory and it corresponds to a defect sector registered in the SDL, the microcomputer 500 reads the subsequent one (i.e., DMA_PSN[i], i=i+1) of physical sector numbers of defect areas sequentially stored in the DMA storage unit 505 and updates its internal memory to the read physical sector number at steps 708 and 709.

After performing the above step 709, the microcomputer 500 determines at step 710 whether the current defect block is to be replaced by the linear replacement method.

If it is determined at the above step 710 that the defect block is to be replaced, not by the linear replacement method, but by the slipping replacement method, the microcomputer 500 outputs a jump command to the encoder 503 at step 711 to jump over 16 sectors including the defect sector. Upon receiving the jump command from the microcomputer 500, the encoder 503 does not write data in the 16 sectors while jumping over them.

If it is determined at the above step 710 that the defect block is to be replaced by the linear replacement method, the microcomputer 500 operates the servo 502 to write the data of the defect block in a replacement block in a spare area at step 712.

On the other hand, in the case where the PID from the decoder 504 is not the same as the physical sector number stored in the internal memory at the above step 707, the microcomputer 500 outputs the write signal to the encoder 503. In response to the write signal from the microcomputer 500, the encoder 503 writes the encoded jth data in the sector PSN[j] at step 713.

The subsequent operation is the same as that of FIG. 7 and a description thereof will thus be omitted.

On the other hand, in the case where the microcomputer 500 receives the read command from the host 200, it sequentially performs the above-mentioned steps to control the decoder 504 to read data written on the optical recording medium.

Third Embodiment

A third embodiment of the present invention relates to the conversion of an LSN included in a write or read command from a host into a PSN, as shown in FIGS. 4 to 11.

That is, upon receiving the write or read command from the host, an optical recording medium write or read section has to detect a PSN from an LSN included in the received write or read command and write or read data on the detected PSN. The reason is that the LSN is a value assigned to only an area in which actual data is written, not an actual position on the disc.

At this time, the optical recording medium write or read section does not write or read data on defect areas registered in a PDL and SDL, as shown in FIGS. 5 to 11.

Namely, the optical recording medium write section performs a write operation while jumping over a physical sector registered in the PDL or replacing a physical block registered in the SDL with a replacement block in a spare area. Also, the optical recording medium write section may perform the write operation in the slipping replacement manner.

If a defect area is present in the data write or read operation, no data is written therein. As a result, no LSN is assigned to the defect area.

In this connection, it is very important to detect an accurate PSN corresponding to an LSN sent from the host. If no accurate PSN is detected, data may be written or read on a faulty position.

Therefore, in the third embodiment of the present invention, tables are pre-mapped as shown in FIGS. 13 to 15, for the detection of a PSN corresponding to an LSN sent from the host.

Figure 1:
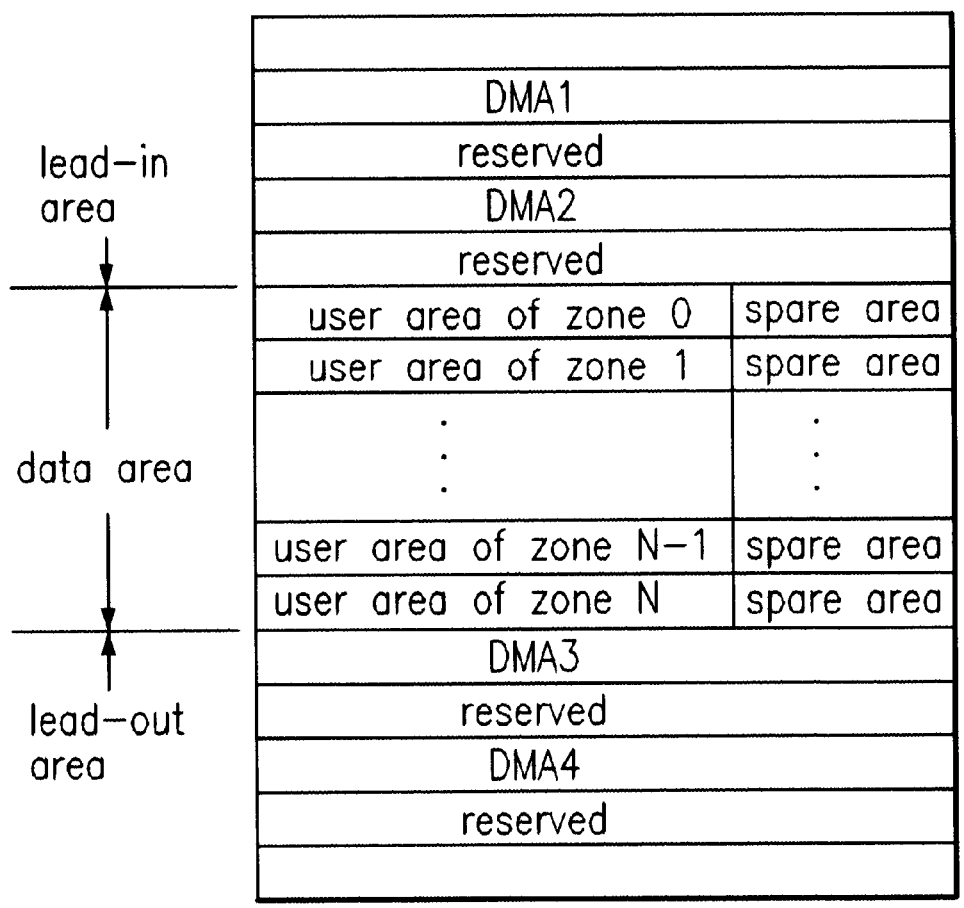
FIG. 1 is a view showing a structure of a general optical disc.
Figure 2:
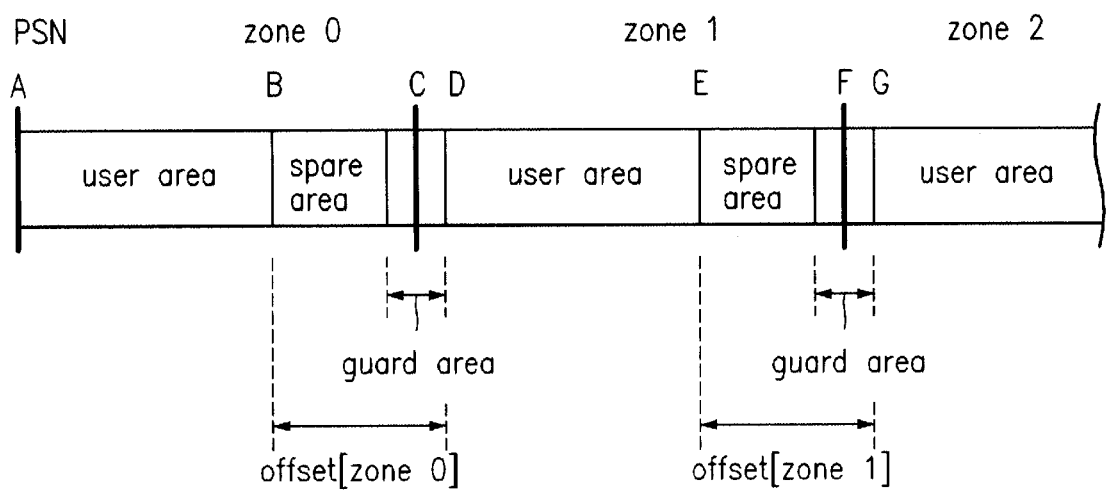
FIG. 2 is a view showing a detailed structure of a data area in FIG. 1.
Figure 3A:
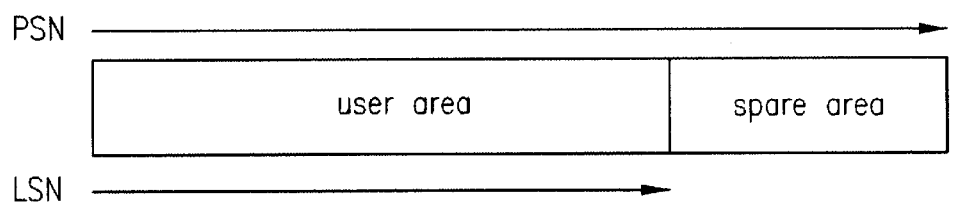
FIG. 3a is a view illustrating a relation between a PSN and an LSN when no defect is present.
Figure 3B:
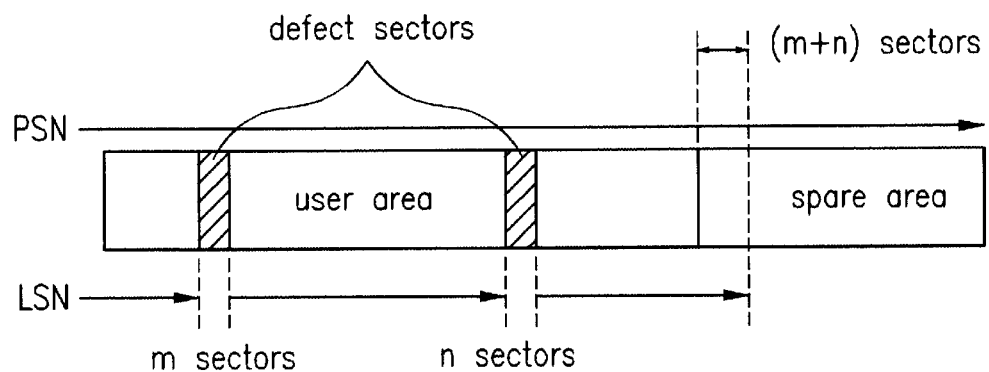
FIG. 3b is a view illustrating a general slipping replacement method and a relation between a PSN and an LSN in the slipping replacement method.
Figure 3C:
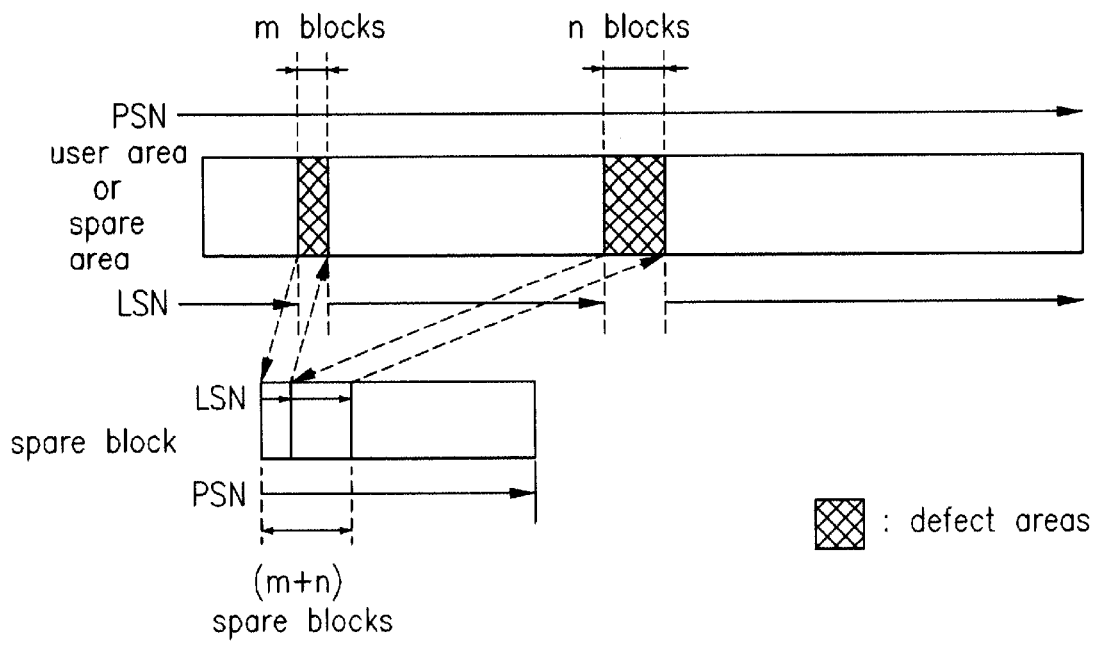
FIG. 3c is a view illustrating a general linear replacement method and a relation between a PSN and an LSN in the linear replacement method.

For example, assume that PSNs indicative of physical zones are defined by A, C, F, . . . and user areas of the respective zones are defined by A, D, G, . . . In this case, FIG. 13 is a table for discrimination between the physical zones, FIG. 14 is a table for detection of a zone to which a start LSN belongs, and FIG. 15 is an offset table for listing the number of sectors corresponding to spare and guard areas between the adjacent zones, in the unit of zones. According to the standard, a start PSN of the data area of the optical disc is 31000h. Hence, if no defect is present, a PSN of a position A in FIG. 2 is 31000h and an LSN thereof is 00000h.

Figure 12:
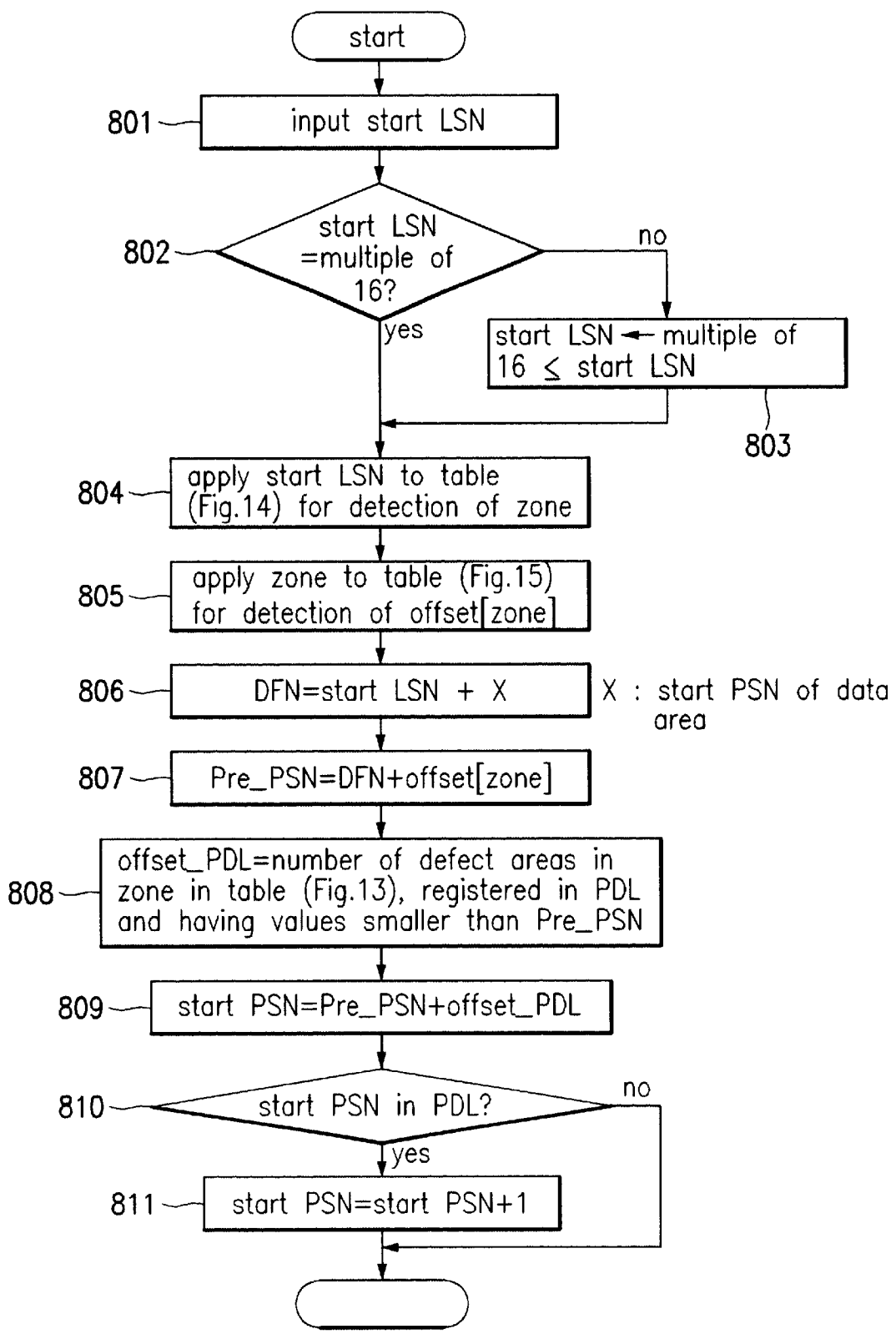
FIG. 12 is a flowchart illustrating an operation of detecting a write or read position on an optical recording medium in accordance with the present invention.

FIG. 12 is a flowchart illustrating an operation of detecting a write or read position on the optical recording medium using the above tables in accordance with the present invention. In the case where data to be written on the optical recording medium is generated or data written on the optical recording medium is to be read, the host first sends a write or read command including a start LSN to the optical recording medium defect areas management apparatus at step 801.

Upon receiving the start LSN from the host, the defect areas management apparatus checks at step 802 whether the received start LSN is a multiple of 16. If the start LSN is a multiple of 16 at step 802, the defect areas management apparatus proceeds directly to step 804. If it is checked at the above step 802 that the start LSN is not a multiple of 16, the defect areas management apparatus converts the start LSN into a multiple of 16 which is not greater than the start LSN and then proceeds to step 804 at step 803. For example, if the start LSN is 33, then it is converted into 32.

In other words, the write/read operations on the optical recording medium are performed in an error correction code (ECC) block unit, or in a 16-sector unit. But, the host generates the start LSN without recognizing such a fact. For this reason, the start LSN must be matched with a first sector number of the ECC block.

At step 804, the start LSN, which is a multiple of 16, is applied to the table as shown in FIG. 14, for detection of a zone to which it belongs.

Namely, if the start LSN is present between 0 and L_zone[0], it is determined that the start LSN belongs to a zone 0. In the case where the start LSN is present between L_zone[0] and L_zone[1], it is determined that the start LSN belongs to a zone 1.

If the zone to which the start LSN belongs is determined in the above-mentioned manner, then it is applied to the table of FIG. 15 at step 805, for detection of an offset[zone]. The reason is that no LSN is assigned to the spare and guard areas between the adjacent zones. If the zone 1 is determined at the above step 804, an offset value corresponding to the zone 1 is read from the table of FIG. 15. The offset[zone] value is the number of sectors corresponding to the spare and guard areas between the adjacent zones.

In the case where the offset value of the corresponding zone is determined at the above step 805, a data field number (referred to hereinafter as DFN) assigned to each sector is obtained at step 806. The DFN can be obtained by the following equation 1:

$$\text{DFN} = \text{start LSN} + X \qquad \text{[equation 1]}$$

where, X is a start PSN of the data area. If no defect is present, the start PSN of the data area is 31000h.

Figure 16A:
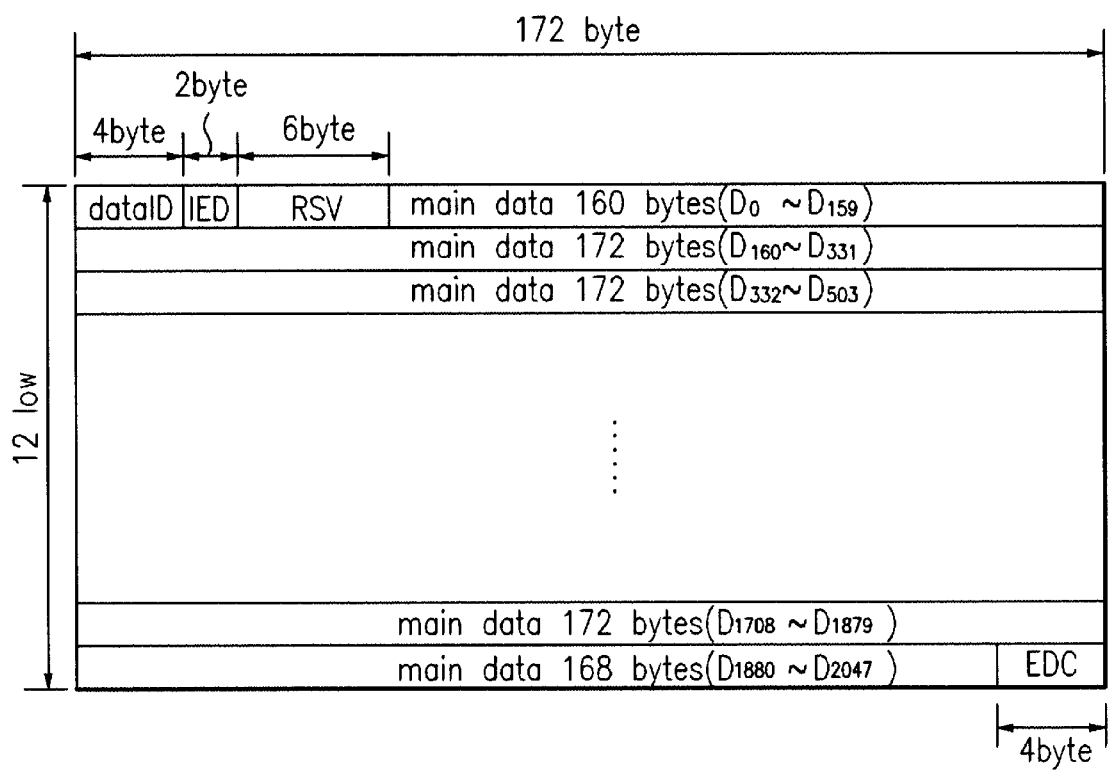
FIG. 16a is a view showing a format of a general data unit 1.
Figure 16B:
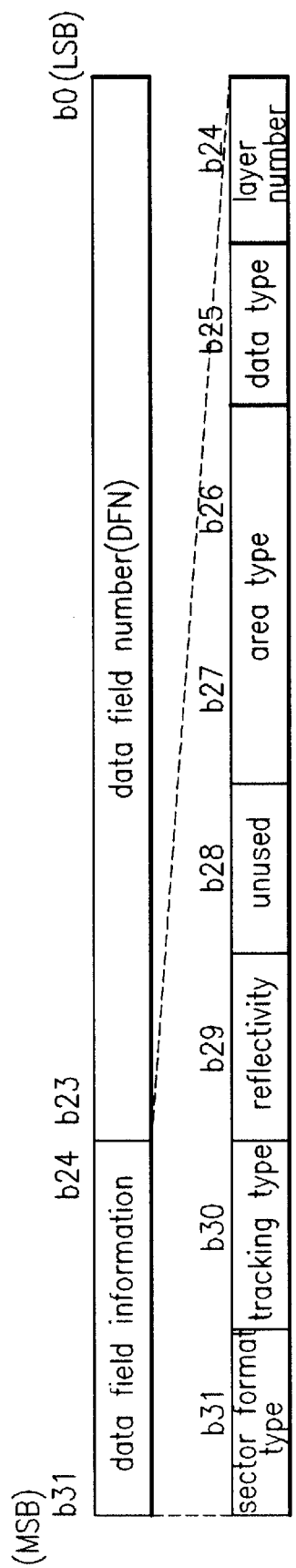

Noticeably, each sector includes a header field, mirror field and recording field. The recording field includes a data field. Data recorded on the data field is classified into a data unit 1, data unit 2 and data unit 3 according to a signal processing steps. As shown in FIG. 16a, the data unit 1 includes a data ID region and a main data region on which actual data is recorded. The data ID is composed of data field information and a DFN, as shown in FIG. 16b. As seen from the above equation 1, the DFN is start LSN+start PSN of data area; This DFN is not assigned to the spare area and guard area, similarly to the LSN.

In this connection, the DFN is not a start PSN on which actual data is to be written or read. Namely, consideration must be taken with respect to the number of sectors in the spare and guard areas of the corresponding zone to which no DFN is assigned. To this end, a temporary start PSN Pre_PSN is obtained at step 807 by adding the offset value of the corresponding zone obtained at the above step 805 to the DFN.

Then, a value offset_PDL is obtained at step 808. This value is the number of defect areas in the corresponding zone in the table of FIG. 13, which are registered in the PDL and have values smaller than the value Pre_PSN. For example, if the value Pre_PSN corresponds to the zone 1 and is 45000h, the number of defect sectors in the zone 1, registered in the PDL, is 10 and the number of defect sectors in the zone 1, smaller than 45000h, is 5, then the value offset_PDL is 5. If defect sectors smaller than 45000h, registered in the PDL, are not present in the zone 1, the value offset_PDL is 0. That is, because no LSN is assigned to defect sectors registered in the PDL but PSNs are assigned thereto, the value offset_PDL must also be considered with respect to the start PSN.

The start PSN is obtained at step 809 by adding the value offset_PDL to the value Pre_PSN, and it is then determined at step 810 whether the obtained start PSN is present in the PDL.

If it is determined at the above step 810 that the start PSN obtained at the above step 809 is not present in the PDL, it is determined as the final start PSN on which actual data is to be written or read. However, in the case where the start PSN obtained at the above step 809 is present in the PDL at the above step 810, the final start PSN is obtained at step 811 by adding one to the start PSN obtained at the above step 809. The reason is that data cannot be written or read on the start PSN obtained at the above step 809 when it is present in the PDL. If the one-incremented start PSN is also present in the PDL, it is again incremented by one. This procedure is repeated until the start PSN is not present in the PDL.

As mentioned above, in the third embodiment of the present invention, there are a pre-mapped table for detection of a zone to which a start LSN belongs and a pre-mapped table for listing the number of sectors corresponding to the spare and guard areas between the adjacent zones. These tables are used to accurately detect a start PSN corresponding to a start LSN sent from the host. Therefore, there is generated no error due to the writing or reading of data on a faulty position. Further, the PSN can readily be detected by the tables although the spare areas are assigned in the unit of zones.

As apparent from the above description, according to the present invention, upon receiving the write or read command from the host, the defect areas management apparatus decodes a PID of a position being currently traced by the optical pickup, generates the resultant physical sector number of the current position and compares it with a physical sector number of a defect area stored in the DMA storage unit. If the two physical sector numbers are the same, the defect areas management apparatus does not write or read data on a sector of the position traced by the optical pickup. Therefore, the defect areas management apparatus is capable of efficiently managing defect areas of the optical recording medium.

Further, the defect areas management apparatus pre-maps the table for detection of a zone to which a start LSN belongs and the offset table for listing the number of sectors corresponding to the spare and guard areas between the adjacent zones, and accurately detects a start PSN corresponding to a start LSN sent from the host, using the pre-mapped tables. Therefore, there is generated no error due to the writing or reading of data on a faulty position.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of managing defect areas of an optical recording medium, comprising the steps of:
    (a) reading a defect management area list and storing the read defect management area list;
    (b) comparing a physical sector number of a current position with said defect management area list stored at said step (a); and
    (c) writing or reading no data to/from a physical sector of the current position if it is determined at said step (b) that said physical sector number of the current position is the same as a physical sector number in said defect management area list stored at said step (a),
       wherein said writing or reading step (c) includes the step of writing or reading data to/from a normal sector subsequent to said physical sector of the current position while jumping over said physical sector, if it is determined at said comparison step (b) that said physical sector number of the current position is the same as said physical sector number in said defect management area list stored at said step (a) and it corresponds to a defect area registered in a primary defect list.

2. A method of managing defect areas of an optical recording medium, as set forth in claim 1, wherein said comparison step (b) includes the step of decoding a physical identification of the current position to generate said physical sector number of the current position.

3. A method of managing defect areas of an optical recording medium, as set forth in claim 1, wherein said comparison step (b) includes the step of reading a physical sector number of a first defect area subsequent to a first sector to be written or read, from said defect management area list stored at said storage step (a), storing the read physical sector number and comparing the stored physical sector number with said physical sector number of the current position.

4. A method of managing defect areas of an optical recording medium, as set forth in claim 3, wherein said comparison step (b) includes the step of, if it is determined that said physical sector number of the current position is the same as the stored physical sector number, reading a physical sector number subsequent to the stored physical sector number, from said defect management area list stored at said storage step (a) and updating the stored physical sector number to the read physical sector number.

5. A method of managing defect areas of an optical recording medium, as set forth in claim 3, wherein said comparison step (b) includes the step of, when said physical sector number of said defect area is stored, indicating that said defect area is that registered in a primary data list or a secondary data list.

6. A method of managing defect areas of an optical recording medium, as set forth in claim 1, wherein said writing or reading step (c) further includes the step of writing or reading data of a block including said physical sector of the current position to/from a replacement block located in a spare area, if it is determined at said comparison step (b) that said physical sector number of the current position is the same as said physical sector number in said defect management area list stored at said storage step (a) and it corresponds to a defect area registered in a secondary defect list.

7. A method of managing defect areas of an optical recording medium, as set forth in claim 1, wherein said writing or reading step (c) further includes the step of writing or reading data to/from a normal block subsequent to a block including said physical sector of the current position while jumping over said physical sector, if it is determined at said comparison step (b) that said physical sector number of the current position is the same as said physical sector number in said defect management area list stored at said storage step (a) and it corresponds to a defect area registered in a secondary detect list.

8. A method of managing defect areas of an optical recording medium, as set forth in claim 1, wherein said writing or reading step (c) includes the step (d) of receiving a logical sector number included in a write or read command from an external host, converting the received logical sector number into a physical sector number and writing or reading data according to the converted physical sector number.

9. A method of managing defect areas of an optical recording medium, as set forth in claim 8 wherein said sector number conversion step (d) includes the steps of:
   (d-1) detecting a zone to which said logical sector number belongs, upon receiving said logical sector number;
   (d-2) obtaining an offset value corresponding to said zone detected at said step (d-1);
   (d-3) adding a start physical sector number of a data area to said logical sector number and then adding said offset value obtained at said step (d-2) to the resultant value to obtain a temporary physical sector number; and
   (d-4) obtaining the number of registered defect areas in a zone corresponding to said temporary physical sector number, which have values smaller than said temporary physical sector number, and adding the obtained value to said temporary physical sector number to obtain a final physical sector number.

10. A method of managing defect areas of an optical recording medium, as set forth in claim 9, wherein said sector number conversion step (d) further includes the step of, if said logical sector number is a start logical sector number and it is not a multiple of an ECC block unit, setting said start logical sector number to a multiple of said ECC block unit.

11. A method of managing defect areas of an optical recording medium, as set forth in claim 9, wherein said zone detection step (d-1) includes the step of pre-mapping a table in such a manner that zones can be distinguished from one another according to logical sector numbers and detecting said zone to which said received logical sector number belongs, using the pre-mapped table.

12. A method of managing defect areas of an optical recording medium, as set forth in claim 9, wherein said offset value obtaining step (d-2) includes the step of pre-mapping a table in such a manner that the number of sectors corresponding to spare and guard areas can be listed in the unit of zones and applying said zone detected at said step (d-1) to the pre-mapped table to obtain said offset value corresponding thereto.

13. A method of managing defect areas of an optical recording medium, as set forth in claim 9, wherein said final physical sector number obtaining step (d-4) includes the step of, if said start physical sector number corresponds to a registered defect sector, incrementing said start physical sector number by one and determining the incremented start physical sector number as said final physical sector number.

14. A method of managing defect areas of an optical recording medium, as set forth in claim 13, wherein said start physical sector number corresponds to a defect sector registered in the primary defect list.

15. An apparatus for managing defect areas of an optical recording medium, which performs data write/read operations in response to a logical sector number and stores information regarding said defect areas in defect management areas, comprising:
   control means for converting said logical sector number into a physical sector number and then generating write/read commands;
   storage means for reading a defect management area list and storing the read defect management area list;
   comparison means for comparing a physical sector number of a current position with said defect management area list stored in said storage means; and
   write/read means for determining whether said data write/read operations are to be performed on a physical sector of the current position, in response to said write/read commands from said control means and the compared result of said comparison means, and for writing or reading data to/from said physical sector of the current position in accordance with the determined result,
   wherein said write/read means is adapted to write or read data to/from a normal sector subsequent to said physical sector of the current position while jumping over said physical sector, if it is determined that said physical sector number of the current position is the same as a physical sector number in said defect management area list stored in said storage means and it corresponds to a defect area registered in a primary defect list.

16. An apparatus for managing defect areas of an optical recording medium, as set forth in claim 15, wherein said control means is adapted to detect a zone to which said logical sector number belongs, obtain an offset value corresponding to the detected zone, add a start physical sector number of a data area to said logical sector number and then add the obtained offset value to the resultant value to obtain a temporary physical sector number.

17. An apparatus for managing defect areas of an optical recording medium, as set forth in claim 16, wherein said control means is adapted to obtain the number of registered defect areas in a zone corresponding to said temporary physical sector number, which have values smaller than said temporary physical sector number, and add the obtained value to said temporary physical sector number to obtain a final physical sector number.

18. An apparatus for managing defect areas of an optical recording medium, as set forth in claim 16, wherein said control means is adapted to pre-map a table in such a manner that zones can be distinguished from one another according to logical sector numbers and detect said zone to which said logical sector number from said host belongs, using the pre-mapped table.

19. An apparatus for managing defect areas of an optical recording medium, as set forth in claim 16, wherein said control means is adapted to pre-map a table in such a manner that the number of sectors corresponding to spare and guard areas can be listed in the unit of zones and apply the detected zone to the pre-mapped table to obtain said offset value corresponding thereto.

20. An apparatus for managing defect areas of an optical recording medium, as set forth in claim 15, wherein each of said write/read commands from said control means includes a physical sector number and a length of data to be written or read.

21. An apparatus for managing defect areas of an optical recording medium, as set forth in claim 15, wherein said comparison means is adapted to detect a physical identification of the current position to generate said physical sector number of the current position.

22. An apparatus for managing defect areas of an optical recording medium, as set forth in claim 15, wherein said comparison means includes a register for reading a physical sector number of a first defect area subsequent to a first sector to be written or read, from said storage means and storing the read physical sector number, said comparison means comparing said physical sector number stored in said register with said physical sector number of the current position.

23. An apparatus for managing defect areas of an optical recording medium, as set forth in claim 22, wherein said comparison means is adapted to, if it is determined that said physical sector number of the current position is the same as said physical sector number stored in said register, read a physical sector number subsequent to the stored physical sector number, from said storage means and update said register to the read physical sector number.

24. An apparatus for managing defect areas of an optical recording medium, as set forth in claim 22, wherein said comparison means is adapted to, when said physical sector number of said defect area is stored in said register, indicate that said defect area is that registered in a primary data list or a secondary data list.

25. An apparatus for managing defect areas of an optical recording medium, as set forth in claim 15, wherein said write/read means is adapted to write or read data of a block including said physical sector of the current position to/from a replacement block in a spare area, if it is determined that said physical sector number of the current position is the same as a physical sector number in said defect management area list stored in said storage means and it corresponds to a defect area registered in a secondary defect list.

26. An apparatus for managing defect areas of an optical recording medium, as set forth in claim 15, wherein said write/read means is adapted to write or read data to/from a normal block subsequent to a block including said physical sector of the current position while jumping over said physical sector, if it is determined that said physical sector number in said defect management area list stored in said storage means and it corresponds to a defect area registered in a secondary defect list.

27. An apparatus for managing defect areas of an optical recording medium, which performs data write/read operations in response to a logical sector number from a host and stores information regarding said defect areas in defect management areas, comprising:

a storage section for reading a defect management area list and storing the read defect management area list;

a control section for converting said logical sector number into a physical sector number, comparing a physical sector number of a current position with said defect management area list stored in said storage section, determining whether said data write/read operations are to be performed on a physical sector of the current position, in accordance with the compared result and generating control signals in accordance with the determined result; and a write/read section for performing said data write/read operations in response to said control signals from said control section, wherein said control section controls said write/read section to write or read data to/from a normal sector subsequent to said physical sector of the current position while jumping over said physical sector, if it is determined that said physical sector number of the current position is the same as a physical sector number in said defect management area list stored in said storage section and it corresponds to a defect area registered in a primary defect list.

28. An apparatus for managing defect areas of an optical recording medium, as set forth in claim 27, wherein said control signals from said control means include write/read enable and disable signals.

29. An apparatus for managing defect areas of an optical recording medium, as set forth in claim 27, wherein said control means is adapted to read a physical sector number of a first defect area subsequent to a first sector to be written or read, from said storage means, store the read physical sector number, compare the stored physical sector number with said physical sector number of the current position, read a physical sector number subsequent to the stored physical sector number, from said storage means if it is determined that said physical sector number of the current position is the same as the stored physical sector number and update the stored physical sector number to the read physical sector number.

30. An apparatus for managing defect areas of an optical recording medium, as set forth in claim 27, wherein said control section controls said write/read section to write or read data of a block including said physical sector of the current position to/from a replacement block in a spare area, if it is determined that said physical sector number of the current position is the same as a physical sector number in said defect management area list stored in said storage section and it corresponds to a defect area registered in a secondary defect list.

31. An apparatus for managing defect areas of an optical recording medium, as set forth in claim 27, wherein said control section controls said write/read section to write or read data to/from a normal block subsequent to a block including said physical sector of the current position while jumping over said physical sector, if it is determined that said physical sector number of the current position is the same as a physical sector number in said defect management area list stored in said storage section and it corresponds to a defect area registered in a secondary defect list.

32. A method of managing defect areas of an optical recording medium, comprising the steps of:

(a) reading a defect management area list and storing the read defect management area list;

(b) comparing a physical sector number of a current position with said defect management area list stored at said step (a); and (c) writing or reading no data on a physical sector of the current position if it is determined at said step (b) that said physical sector number of the current position is the same as a physical sector number in said defect management area list stored at said step (a), wherein said writing or reading step (c) includes the step (c1) of writing or reading data of a block including said physical sector of the current position to/from a replacement block located in a spare area or the step (c2) of writing or reading data to/from a normal block subsequent to a block including said physical sector of the current position while jumping over said physical sector, if it is determined at said comparison step (b) that said physical sector number of the current position is the same as said physical sector number in said defect management area list stored at said storage step (a) and it corresponds to a defect area registered in a secondary defect list.

33. A method of managing defect areas of an optical recording medium using defect management areas which store information regarding said defect area, comprising the steps of:
(a) reading a defect management area list and storing the read defect management area list;
(b) comparing a physical sector number of a current position with said defect management area list stored at said step (a); and
(c) writing or reading no data on a physical sector of the current position if it is determined at said step (b) that said physical sector number of the current position is the same as a physical sector number in said defect management area list stored at said step (a),
wherein said writing or reading step (c) includes the step (d) of receiving a logical sector number included in a write or read command from an external host, converting the received logical sector number into a physical sector number and writing or reading data according to the converted physical sector number,
wherein said sector number conversion step (d) includes the steps of,
(d-1) detecting a zone to which said logical sector number belongs, upon receiving said logical sector number;
(d-2) obtaining an offset value corresponding to said zone detected at said step (d-1);
(d-3) adding a start physical sector number of a data area to said logical sector number and then adding said offset value obtained at said step (d-2) to the resultant value to obtain a temporary physical sector number; and
(d-4) obtaining the number of registered defect areas in a zone corresponding to said temporary physical sector number, which have values smaller than said temporary physical sector number, and adding the obtained value to said temporary physical sector number to obtain a final physical sector number.

34. An apparatus for managing defect areas of an optical recording medium, which performs data write/read operations in response to a logical sector number from a host and stores information regarding said defect areas in defect management areas, comprising:
control means for converting said logical sector number into a physical sector number and generating write/read commands;
storage means for reading a defect management area list and storing the read defect management area list;
comparison means for comparing a physical sector number of a current position with said defect management area list stored in said storage means; and
write/read means for determining whether said data write/read operations are to be performed on a physical sector of the current position, in response to said write/read commands from said control means and the compared result of said comparison means and for writing or reading data on said physical sector of the current position in accordance with the determined result,
wherein said writing or reading step (c) includes the step (d) of receiving a logical sector number included in a write or read command from a host, converting the received logical sector number into a physical sector number, and writing or reading data according to the converting physical sector number,
wherein said sector number conversion step (d) includes the steps of,
(d-1) detecting a zone to which said logical sector number belongs, upon receiving said logical sector number;
(d-2) obtaining an offset value corresponding to said zone detected at said step (d-1);
(d-3) adding a start physical sector number of a data area to said logical sector number and adding said offset value obtained at said step (d-2) to the resultant value to obtain a temporary physical sector number; and
(d-4) obtaining the number of registered defect areas in a zone corresponding to said temporary physical sector number, and adding the obtained value to said temporary physical sector number to obtain a final physical sector number.

35. An apparatus for managing defect areas of an optical recording medium, which performs data write/read operations in response to a logical sector number from a host and stores information regarding said defect areas in defect management areas, comprising:
control means for converting said logical sector number into a physical sector number and generating write/read commands;
storage means for reading a defect management area list and storing the read defect management area list;
comparison means for comparing a physical sector number of a current position with said defect management area list stored in said storage means; and
write/read means for determining whether said data write/read operations are to be performed on a physical sector of the current position, in response to said write/read commands from said control means and the compared result of said comparison means, and for writing or reading data on said physical sector of the current position in accordance with the determined result,
wherein said write/read means is adapted to write or read data of a block including said physical sector of the current position to/from a replacement block in a spare area or is adapted to write or read data to/from a normal block subsequent to a block including said physical sector of the current position while jumping over said physical sector, if it is determined that said physical sector number in said defect management area list stored in said storage means and it corresponds to a defect area registered in a secondary defect list.

36. An apparatus for managing defect areas of an optical recording medium, which performs data write/read operations in response to a logical sector number from a host and stores information regarding said defect areas in defect management areas, comprising:
a storage section for reading a defect management area list and storing the read defect management area list;
a control section for converting said logical sector number into a physical sector number, comparing a physical sector number of a current position with said defect management area list stored in said storage section, determining whether said data write/read operations are to be performed on a physical sector of the current position in accordance with the compared result, and generating control signals in accordance with the determined result; and a write/read section for performing said data write/read operations in response to said control signals from said control section,
   wherein said control section controls said write/read section to write or read data of a block including said physical sector of the current position to/from a replacement block in a spare area or controls said write/read section to write or read data to/from a normal block subsequent to a block including said physical sector of the current position while jumping over said physical sector, if it is determined that said physical sector number of the current position is the same as a physical sector number in said defect management area list stored in said storage section and it corresponds to a defect area registered in a secondary defect list.

* * * * *